United States Patent
Ho et al.

(10) Patent No.: US 8,638,699 B2
(45) Date of Patent: Jan. 28, 2014

(54) METHOD AND APPARATUS FOR SUPPORTING THE LARGE SERVICE DATA UNIT (SDU)

(75) Inventors: Sai Yiu Duncan Ho, San Diego, CA (US); Arnaud Meylan, Juziers (FR)

(73) Assignee: QUALCOMM Incorporated, San Diego, CA (US)

( * ) Notice: Subject to any disclaimer, the term of this patent is extended or adjusted under 35 U.S.C. 154(b) by 713 days.

(21) Appl. No.: 12/615,143

(22) Filed: Nov. 9, 2009

(65) Prior Publication Data

US 2010/0135212 A1      Jun. 3, 2010

Related U.S. Application Data

(60) Provisional application No. 61/112,928, filed on Nov. 10, 2008.

(51) Int. Cl.
- *H04B 7/00* (2006.01)
- *H04W 4/00* (2009.01)
- *H04L 12/66* (2006.01)

(52) U.S. Cl.
USPC ............................ 370/310; 370/328; 370/352

(58) Field of Classification Search
USPC .......................................................... 370/328
See application file for complete search history.

(56) References Cited

U.S. PATENT DOCUMENTS

| | | | |
|---|---|---|---|
| 7,571,358 B2 | 8/2009 | Yi et al. | |
| 2005/0238051 A1 | 10/2005 | Yi et al. | |
| 2007/0121540 A1* | 5/2007 | Sharp et al. | 370/328 |
| 2007/0253447 A1 | 11/2007 | Jiang | |
| 2008/0031253 A1 | 2/2008 | Kim et al. | |
| 2008/0170531 A1* | 7/2008 | Petry et al. | 370/312 |
| 2008/0188224 A1 | 8/2008 | Pani et al. | |
| 2009/0046626 A1* | 2/2009 | Shao et al. | 370/320 |
| 2009/0086659 A1* | 4/2009 | Pani et al. | 370/310 |

(Continued)

FOREIGN PATENT DOCUMENTS

| | | |
|---|---|---|
| CN | 101170390 A | 4/2008 |
| CN | 101175024 A | 5/2008 |

(Continued)

OTHER PUBLICATIONS

Ericsson: "Configurable values for the minimum and maximum RLC PDU size", 3GPP Draft; R2-081505, 3rd Generation Partnership Project (3GPP), Mobile Competence Centre ; 650, Route des Lucioles ; F-06921 Sophia-Antipolis Cedex ; France, vol. RAN WG2, No. Shenzhen, China; 20080324, Mar. 24, 2008, XP050139246.

(Continued)

*Primary Examiner* — Brandon Renner
(74) *Attorney, Agent, or Firm* — Nerrie M. Zohn

(57) ABSTRACT

Systems and methodologies are described that segment or concatenate radio link control (RLC) service data units (SDUs) into RLC protocol data units (PDUs). In accordance with various aspects set forth herein, systems and/or methods are provided that receive a first RLC SDU, partition the first RLC SDU into a first RLC PDU and a second RLC PDU, set a length indicator (LI) field associated with the second RLC PDU to indicate the size of information contained in the second RLC PDU, concatenate the second RLC PDU with a third RLC PDU associated with a second RLC SDU to form a concatenated RLC PDU, and dispatch the first RLC PDU, the concatenated RLC PDU, and a fourth RLC PDU associated with the second RLC SDU.

25 Claims, 15 Drawing Sheets

(56) References Cited

U.S. PATENT DOCUMENTS

| | | | | |
|---|---|---|---|---|
| 2009/0086853 | A1* | 4/2009 | Ye | 375/340 |
| 2009/0092079 | A1* | 4/2009 | Marinier et al. | 370/328 |
| 2009/0185477 | A1 | 7/2009 | Lee et al. | |
| 2009/0290598 | A1* | 11/2009 | Pani et al. | 370/473 |
| 2009/0323671 | A1* | 12/2009 | Wu | 370/352 |
| 2010/0135326 | A1 | 6/2010 | Ray et al. | |
| 2010/0158044 | A1 | 6/2010 | Ray et al. | |
| 2010/0189059 | A1 | 7/2010 | Yang | |
| 2010/0208632 | A1 | 8/2010 | Ray et al. | |
| 2010/0208654 | A1 | 8/2010 | Sampath et al. | |

FOREIGN PATENT DOCUMENTS

| | | | |
|---|---|---|---|
| CN | 101330492 A | | 12/2008 |
| EP | 1119948 A1 | | 8/2001 |
| JP | 2002527945 A | | 8/2002 |
| JP | 2008113095 A | | 5/2008 |
| JP | 2009509432 A | | 3/2009 |
| JP | 2010508754 A | | 3/2010 |
| WO | WO0021253 A1 | | 4/2000 |
| WO | 2007039023 A1 | | 4/2007 |
| WO | 2008041596 A1 | | 4/2008 |
| WO | 2008049472 A1 | | 5/2008 |
| WO | 2008084992 A1 | | 7/2008 |
| WO | 2008137962 A2 | | 11/2008 |
| WO | 2008154816 A1 | | 12/2008 |
| WO | 2009122831 A1 | | 10/2009 |

OTHER PUBLICATIONS

Ericsson: "Configurable values for the minimum and maximum RLC PDU size", 3GPP Draft; R2-082771, 3rd Generation Partnership Project (3GPP), Mobile Competence Centre ; 650, Route des Lucioles ; F-06921 Sophia-Antipolis Cedex ; France, vol. RAN WG2, No. Kansas City, USA; May 9, 2008, XP050140357.

International Search Report and Written Opinion—PCT/US2009/063851, International Search Authority—European Patent Office—Dec. 20, 2010.

Universal Mobile Telecommunications System (UMTS); Radio Link Control (RLC) protocol specification (3GPP TS 25.322 version 7.7.0 Release 7); ETSI TS 125 322, ETSI'Standard, European Telecommunications Standards Institute (ETSI), Sophia Antipolis Cedex, France, vol. 3-R2, No. V7.7.0, Jul. 1, 2008, XP014042118.

"RLC SDU larger than 2047 octets", 3GPP TSG RAN WG2 #64 meeting R2-086818, Nov. 10-14, 2008, Prague, Czech Republic, Source: Panasonic.

3GPP TS 36.322, "3rd Generation Partnership Project;Technical Specification Group Radio Access Network;Evolved Universal Terrestrial Radio Access (E-UTRA) Radio Link Control (RLC) protocol specification (Release 9)", version 9.0.0., Sections 5.1.2.2.3 and 5.1.3.2.3 , Dec. 2009.

3GPP TS 36.322, "3rd Generation Partnership Project;Technical Specification Group Radio Access Network;Evolved Universal Terrestrial Radio Access (E-UTRA)Radio Link Control (RLC) protocol specification (Release 8)", V8.1.0 (V), Sections 5.1.2.2.3 and 5.1.3.2.3, Mar. 2008.

3GPP TS 36.322, "3rd Generation Partnership Project;Technical Specification Group Radio Access Network;Evolved Universal Terrestrial Radio Access (E-UTRA)Radio Link Control (RLC) protocol specification(Release 8)", V8.0.0, 5.1.2 and 5.1.3, Dec. 2007.

Alcatel-Lucent: "Comparison of different SN handling at Layer 2" 3GPP Draft; R2073455 Comparison of Different SN Handling At Layer 2, SRD Generation Partnership Project (3GPP), Mobile Competence Centre; 650, Route Des Lucioles; F-06921 Sophia-Antipolis Cedex; France, vol. RAN WG2, no. Athens, Greece; 20070815, Aug. 15, 2007, XP050136160 [retrieved on Aug. 15, 2007] p. 1-p. 2 p. 5-p. 6.

Motorola: "Introduction of new MAC-ehs test cases" 3GPP Draft; R5-073408, 3rd Generation Partnership Project (3GPP), Mobile Competence Centre; 650, Route Des Lucioles; F-06921 Sophia-Antipolis Cedex; France, vol. RAN WG5, no. Jeju; 20071109, Nov. 9, 2007, XP050186230.

"Universal Mobile Telecommunications System (UMTS); Medium Access Control (MAC) protocol specification (3GPP TS 25.321 version 7.7.0 Release 7); ETSI TS 125 321" ETSI Standards, LIS, Sophia Antipolis Cedex, France, vol. 3-R2, No. V7.7.0, Jan. 1, 2008, XP014040632, ISSN: 0000-0001.

3GPP: "Technical Specification Group Radio Access Network; Radio Link Control (RLC) protocol specification (Release 7)", 3rd Generation Partnership Project; 3GPP TS 25.322 V7.7.0 (May 2008), Sophia Antipolis Valbonne, May 31, 2008, pp. 1-82.

Taiwan Search Report—TW098138184—TIPO—Mar. 4, 2013.

\* cited by examiner

METHOD AND APPARATUS FOR SUPPORTING THE LARGE SERVICE DATA UNIT (SDU)

CLAIM OF PRIORITY UNDER 35 U.S.C. §119

The present Application for Patent claims priority to Provisional Application No. 61/112,928, entitled "A METHOD AND APPARATUS FOR SUPPORTING LARGE SERVICE DATA UNIT (SDU) IN A WIRELESS COMMUNICATION SYSTEM", filed Nov. 10, 2008, which is assigned to the assignee hereof and hereby expressly incorporated by reference herein.

BACKGROUND

I. Field

The following description relates generally to wireless communications, and more particularly to segmenting and/or concatenating radio link control (RLC) service data units (SDUs) into RLC protocol data units (PDUs), wherein the RLC SDUs typically have sizes that exceed 2047 bytes.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), 3GPP Long Term Evolution (LTE) systems, and others.

Generally, wireless multiple-access communication systems can simultaneously support communication for multiple access terminals. Each access terminal can communicate with one or more base stations via transmissions on forward and reverse links The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

The Long Term Evolution (LTE) Layer 2 user-plane protocol stack is generally composed of three sub layers: the packet data convergence protocol (PDCP) layer; the radio link control (RLC) layer; and the medium access control (MAC) layer. Typically, the PDCP layer (currently the top of the Layer 2 protocol stack) processes radio resource control (RRC) messages in the control plane and Internet Protocol (IP) packets in the user plane. Depending on the radio bearer, the main functions of the PDCP layer are header compression, security, and support for reordering and retransmission during handover. The RLC layer generally provides segmentation and/or reassembly of upper layer packets in order to adapt them to a size which can actually be transmitted over the radio interface. For radio bearers which require error-free transmission, the RLC layer can also perform retransmission to recover from packet losses. Additionally, the RLC layer performs reordering to compensate for out-of-order reception due to hybrid automatic repeat request (HARD) operation in the MAC layer. The MAC layer (currently the bottom of the Layer 2 protocol stack) performs multiplexing of data from different radio bearers. By deciding the amount of data that can be transmitted from each radio bearer and instructing the RLC layer as to the size of packets to provide, the MAC layer aims to achieve the negotiated quality of service (QoS) for each radio bearer. For the uplink, this process can include reporting to the base station or eNodeB the amount of buffered data for transmission.

At the transmitting side, each layer can receive a service data unit (SDU) from a higher layer, for which the layer provides a service, and outputs a protocol data unit (PDU) to the layer below. For instance, the RLC layer can receive packets from the PDCP layer. These packets are typically called PDCP PDUs from a PDCP perspective and represent RLC SDUs from the RLC point of view. The RLC layer creates packets which are provided to the layer below (e.g., the MAC layer). The packets which the RLC provides the MAC layer are RLC PDUs from an RLC perspective, and MAC SDUs from the MAC point of view. At the receiving side the process is reversed, with each layer passing SDUs up the stack where they are received as PDUs.

An important design feature of the LTE protocol stack is that all the PDUs and SDUs are byte aligned (e.g., the lengths of the PDUs and SDUs are multiples of 8 bits). This is to facilitate handling by microprocessors, which are typically defined to handle packets in units of bytes. In order to further reduce the processing requirements of the user plane protocol stack in LTE, the headers created by each of the PDCP, RLC, and MAC layers are also byte aligned. This implies that sometimes unused padding bits are needed in the headers, and thus the cost of designing for efficient processing is that a small amount of potentially available capacity is wasted.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The subject application in accordance with one or more aspects discloses a method that segments or concatenates radio link control (RLC) service data units (SDUs) into RLC protocol data units (PDUs). The method comprising the acts of receiving a first RLC SDU, partitioning the first RLC SDU into a first RLC PDU and a second RLC PDU, wherein the second RLC PDU is limited to 2047 bytes in size, setting a length indicator (LI) field associated with the second RLC PDU to indicate the size of information contained in the second RLC PDU, concatenating the second RLC PDU with a third RLC PDU associated with a second RLC SDU to form a concatenated RLC PDU, and dispatching the first RLC PDU, the concatenated RLC PDU, and a fourth RLC PDU associated with the second RLC SDU.

In accordance with further aspects, the subject application provides a wireless communications apparatus that comprises a memory that retains instructions related to segmenting a first radio link control (RLC) service data unit (SDU) into a first RLC protocol data unit (PDU) and a second RLC PDU, wherein the second RLC PDU is limited to 2047 bytes in size, setting a length indicator (LI) field associated with the second RLC PDU to indicate the size of information contained in the second RLC PDU, aggregating the second RLC PDU with a third RLC PDU associated with a second RLC SDU to form a concatenated RLC PDU, and dispatching the first RLC PDU, the concatenated RLC PDU, and a fourth RLC PDU associated with the second RLC SDU. Additionally, the wireless communications apparatus can include a processor, coupled to the memory, configured to execute the instructions retained in the memory.

Furthermore, in accordance with yet further aspects, the subject application provides a wireless communications apparatus that segments or concatenates radio link control (RLC) service data units (SDUs) into RLC protocol data units (PDUs), wherein the wireless communications apparatus comprises means for receiving a first RLC SDU, means for partitioning the first RLC SDU into a first RLC PDU and a second RLC PDU, wherein the second RLC PDU is limited to 2047 bytes in size, means for setting a length indicator (LI) field associated with the second RLC PDU to indicate the size of information contained in the second RLC PDU, means for concatenating the second RLC PDU with a third RLC PDU associated with a second RLC SDU to form a concatenated RLC PDU, and means for dispatching the first RLC PDU, the concatenated RLC PDU, and a fourth RLC PDU associated with the second RLC SDU.

In accordance with further aspects, the subject application discloses a computer program product that comprises a computer-readable medium. The computer-readable medium includes code for receiving a first radio link control (RLC) service data unit (SDU), code for dividing the first RLC SDU into a first RLC protocol data unit (PDU) and a second RLC PDU, wherein the second RLC PDU is limited to 2047 bytes in size, code for setting a length indicator (LI) field associated with the second RLC PDU to indicate the size of information contained in the second RLC PDU, code for conjoining the second RLC PDU with a third RLC PDU associated with a second RLC SDU to form a concatenated RLC PDU, and code for dispatching the first RLC PDU, the concatenated RLC PDU, and a fourth RLC PDU associated with the second RLC SDU.

Additionally, the subject application discloses a wireless communications apparatus, comprising a processor configured to: receive a first radio link control (RLC) service data unit (SDU), split the first RLC SDU into a first RLC protocol data unit (PDU) and a second RLC PDU, wherein the second RLC PDU is limited to 2047 bytes in size, set a length indicator (LI) field associated with the second RLC PDU to indicate the size of information contained in the second RLC PDU, concatenate the second RLC PDU with a third RLC PDU associated with a second RLC SDU to form a concatenated RLC PDU, and dispatch the first RLC PDU, the concatenated RLC PDU, and a fourth RLC PDU associated with the second RLC SDU.

Moreover, the subject application also discloses a method that segments or concatenates radio link control (RLC) service data units (SDUs) into RLC protocol data units (PDUs). The method comprises receiving a first RLC PDU, a concatenated PDU, and a fourth RLC PDU, utilizing a length indicator (LI) field associated with the concatenated PDU to ascertain a boundary between a second RLC PDU and a third RLC PDU, the second RLC PDU and the third RLC PDU included in the concatenated PDU, and reassembling the first RLC PDU, the second RLC PDU, the third RLC PDU, and the fourth RLC PDU into a first RLC SDU and a second RLC SDU.

Furthermore, the subject application discloses a wireless communications apparatus that comprises a memory that retains instructions related to acquiring a first radio link (RLC) protocol data unit (PDU), a concatenated PDU, and a fourth RLC PDU, utilizing a length indicator (LI) field associated with the concatenated PDU to ascertain a demarcation between a second RLC PDU and a third RLC PDU, the second RLC PDU and the third RLC PDU included in the concatenated PDU, and aggregating the first RLC PDU and the second RLC PDU into a first RLC service data unit (SDU) and the third RLC PDU and the fourth RLC PDU into a second RLC SDU. Additionally, the wireless communication apparatus also includes a processor, coupled to the memory, configured to execute the instructions retained in the memory.

Moreover, the subject application also discloses a wireless communications apparatus that segments or concatenates radio link control (RLC) service data units (SDUs) into RLC protocol data units (PDUs), wherein the wireless communications apparatus includes means for receiving a first RLC PDU, a concatenated PDU, and a fourth RLC PDU, means for utilizing a length indicator (LI) field associated with the concatenated PDU to ascertain a boundary between a second RLC PDU and a third RLC PDU, the second RLC PDU and the third RLC PDU included in the concatenated PDU, and means for assembling the first RLC PDU, the second RLC PDU, the third RLC PDU, and the fourth RLC PDU into a first RLC SDU and a second RLC SDU.

In accordance with further aspects, the subject applications discloses a computer program product that includes a computer-readable medium, wherein the computer-readable medium comprises code for receiving a first radio link control (RLC) protocol data unit (PDU), a concatenated PDU, and a fourth RLC PDU, code for utilizing a length indicator (LI) field associated with the concatenated PDU to ascertain a boundary between a second RLC PDU and a third RLC PDU, the second RLC PDU and the third RLC PDU included in the concatenated PDU, and code for aggregating the first RLC PDU and the second RLC PDU into a first RLC service data unit (SDU) and the third RLC PDU, and the fourth RLC PDU into a second RLC SDU.

In accordance with yet further aspects, the subject application discloses a wireless communications apparatus, that comprises a processor configured to: receive a first radio link control (RLC) protocol data unit (PDU), a concatenated PDU, and a fourth RLC PDU, utilize a length indicator (LI) field associated with the concatenated PDU to ascertain a boundary between a second RLC PDU and a third RLC PDU, the second RLC PDU and the third RLC PDU included in the concatenated PDU; and reassemble the first RLC PDU, the second RLC PDU, the third RLC PDU, and the fourth RLC PDU respectively into a first RLC service data unit (SDU) and a second RLC SDU.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
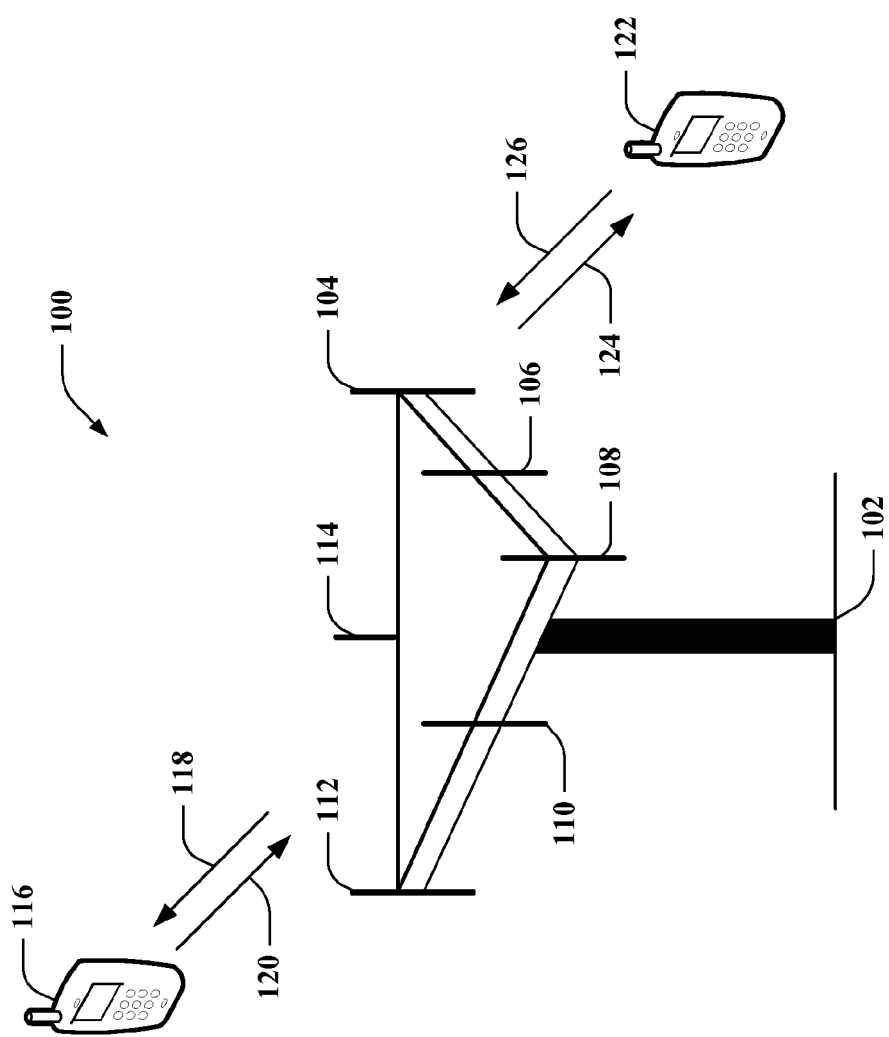
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

SC-FDMA utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage area, access terminals in neighboring cells can be subject to less interference as compared to a base station transmitting through a single antenna to all its access terminals.

Figure 2:
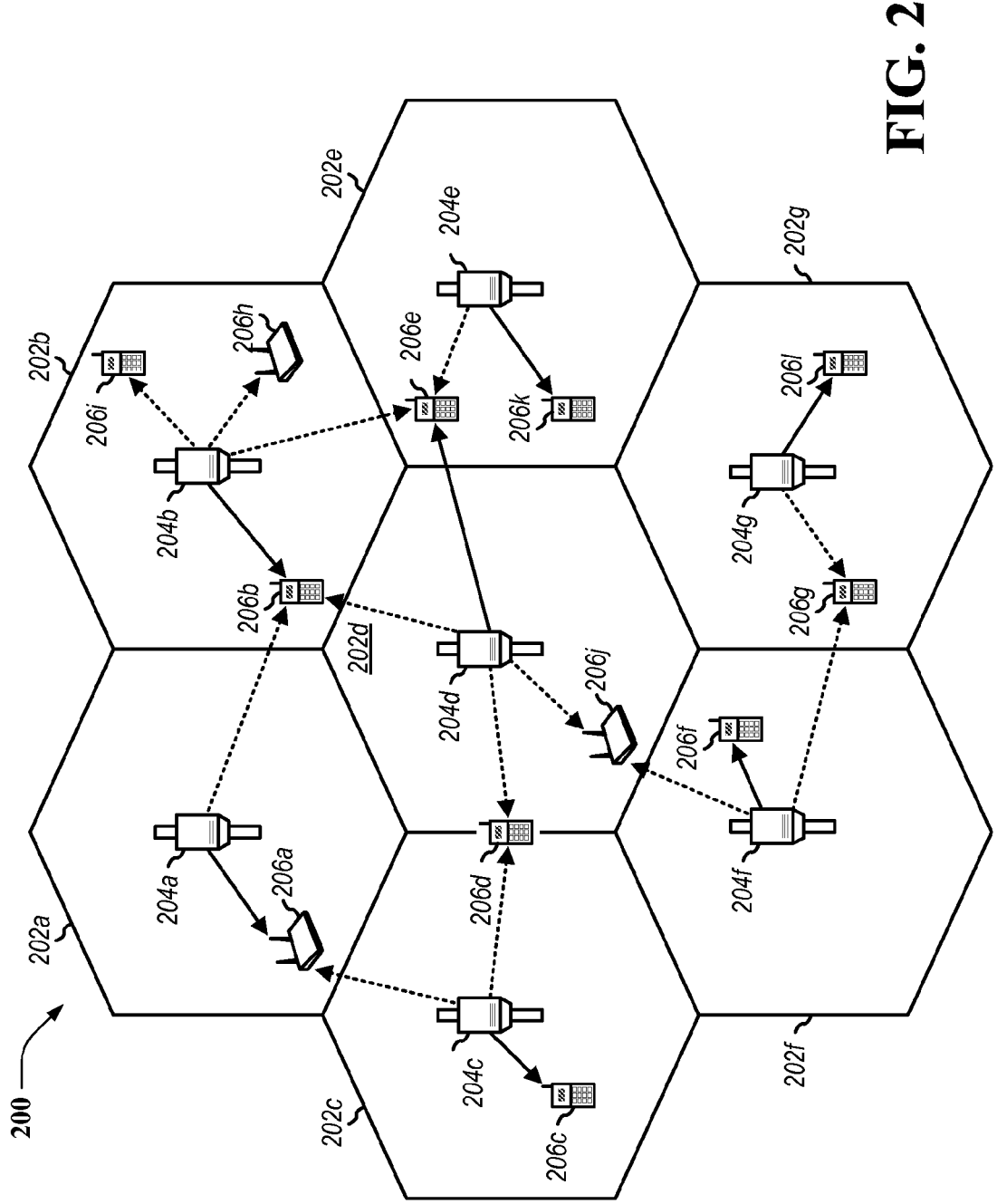
FIG. 2 provides illustration of a further wireless communication system configured to support a number of users, in which various disclosed embodiments and aspects can be implemented.

FIG. 2 provides illustration of a further wireless communication system 200 configured to support a number of users, in which various disclosed embodiments and aspects may be implemented. As shown in FIG. 2, by way of example, system 200 provides communication for multiple cells 202, such as, for example, macro cells 202a-202g, with each cell being serviced by a corresponding access point (AP) 204 (such as APs 204a-204g). Each cell may be further divided into one or more sectors. Various access terminals (ATs) 206, including ATs 206a-206k, also known interchangeably as user equipment (UE) or mobile stations, are dispersed throughout the system. Each AT 206 may communicate with one or more APs 204 on a forward link (FL) and/or a reverse link (RL) at a given moment, depending upon whether the AT is active and whether it is in soft handoff, for example. The wireless communication system 200 may provide service over a large geographic region, for example, macro cells 202a-202g may cover a few blocks in a neighborhood.

As a prelude to a more detailed exposition of the subject application, it will be appreciated by those of moderate skill in this field of endeavor that a radio link control (RLC) layer receives as input data blocks provided by the protocol data convergence protocol (PDCP) layer (e.g., the RLC layer receives RLC service data units (SDUs)). In order to fill the payload part of a RLC protocol data unit (PDU) therefore, the RLC utilizes two mechanisms known as segmentation and concatenation.

When a RLC SDU cannot be added to a given payload because the remaining size of the PDU is too short or small for the purpose, the SDU is then segmented and therefore transmitted using two different or disparate PDUs. Where on the other hand the SDU size is smaller than the PDU, the RLC layer will concatenate as many SDUs as possible in order to fill the payload.

It should also be noted without limitation or loss of generality that the disclosed facilities and/or functionalities can be utilized with equal applicability by both access terminals, mobile devices, or user equipment as well as base stations, access points, Node Bs, or Evolved Node Bs (eNodeBs). It should further be appreciated that the subject disclosure includes aspects that can be employed during both the transmission and/or receiving phase of wireless communications.

RLC is a protocol that provides framing for upper level packets. The framing is typically performed by indicating, with a length indicator (LI) field, the position of the last byte of an RLC SDU within a RLC PDU. Because the size of the LI field is currently specified as being 11 bits, RLC can typically only indicate when the end of a RLC PDU occurs after less than 2048 bytes (e.g., $2^{11}$ bytes).

Currently, the maximum transport block (TB) size is 149,776 bits, or 18,722 bytes. In order to achieve a maximum bit rate, with the maximum SDU at 2047 (e.g., $2^{11}-1$) bytes, the number of PDCP SDUs to process per transmission time interval (TTI), is 10. With PDCP SDUs of up to 16 Kbytes, only two SDUs are generally required per TTI which can reduce the PDCP header processing by at least a factor of 5.

Figure 3:
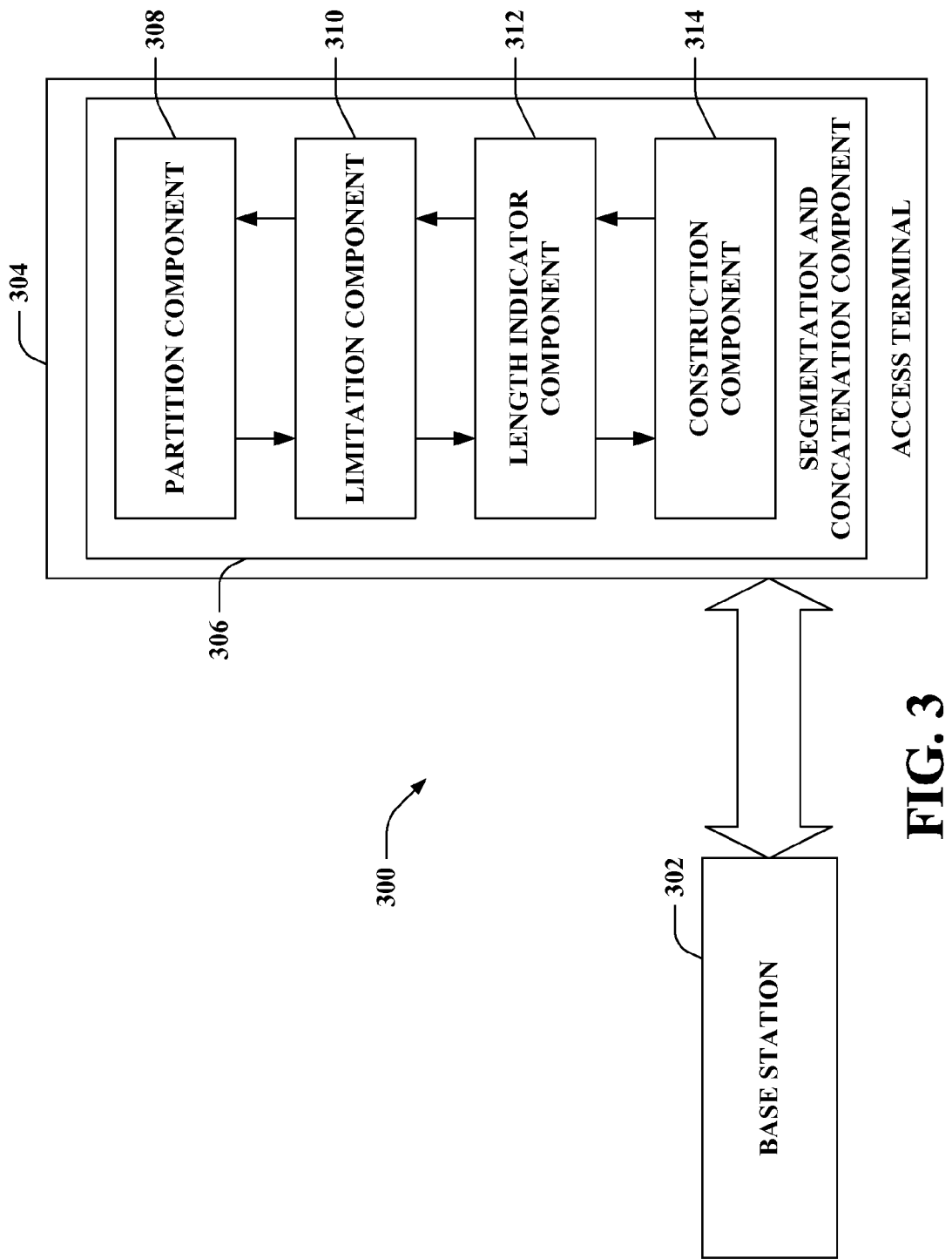
FIG. 3 is an illustration of an example system that effectuates and/or facilitates segmentation and/or concatenation of RLC SDUs into RLC PDUs in accordance with various aspects of the subject disclosure.

Turning now to FIG. 3 that illustrates a system 300 that effectuates and/or facilitates segmentation and/or concatenation of RLC SDUs into RLC PDUs, wherein the RLC SDUs have sizes greater than 2047 bytes. As depicted, system 300 includes base station 302 and access terminal 304 that can be in continuous and/or operative or sporadic and/or intermittent communication with one another. Since the basic functionalities of base station 302 and access terminal 304, respectively, have been elucidated above in connection with FIG. 1 and FIG. 2, a further detailed description of such features has been omitted to avoid needless repetition and for the sake of brevity and conciseness. Nonetheless, as depicted, access terminal 304 can include segmentation and concatenation component 306 that in accordance with one aspect, can obtain and/or acquire RLC SDUs and determine the total size of the acquired or obtained RLC SDU. On receipt of the RLC SDU, segmentation and concatenation component 306 can partition or fractionate the incoming RLC SDU into one or more RLC PDUs while ensuring that the RLC PDU that includes the tail end of any RLC SDU does not exceed 2047 bytes in size. Segmentation and concatenation component 306 can thereafter dispatch or transmit the RLC PDUs appropriately to a receiving device or receiving means.

Segmentation and concatenation component 306, in accordance with further aspects set forth in this disclosure, can receive RLC PDUs and on receipt of the RLC PDUs can keep track of RLC PDUs that include the final stages of any RLC SDU (e.g., without limitation or loss of generality, segmentation and concatenation component 306 can note that RLC PDUs that do not exceed 2047 bytes are typically to be associated with the tail end of the RLC SDU). Segmentation and concatenation component 306 can thereafter reconstitute the RLC SDUs from the various received RLC PDUs while being cognizant that RLC PDUs that generally do not exceed 2047 bytes are typically to be associated with the culminating portion of respective RLC SDUs.

In accordance with further aspects of the subject disclosure, segmentation and concatenation component 306 can acquire or obtain RLC SDUs and thereafter can partition or segment the received RLC SDUs into RLC PDUs while ensuring that RLC PDUs associated with concluding portions of a RLC SDU do not exceed 2047 bytes. Based at least in part on the size (e.g., payload size) of the RLC PDU, a length indicator (LI) field can be set (e.g., through use of a flag bit included in the RLC PDU header) and utilized to indicate the size of the RLC PDU associated with the closing portions of a particular RLC SDU. Segmentation and concatenation component 306 can thereafter, where appropriate, reassemble, conjoin or concatenate RLC PDUs and dispatch all the RLC PDUs (including concatenated RLC PDUs) to a receiving aspect. It should be noted without limitation or loss of generality that reassembled, conjoined or concatenated RLC PDUs can far surpass the 2047 byte limitation set under the current standards.

In accordance with yet further aspects of the subject disclosure, segmentation and concatenation component 306 can receive RLC PDUs (including concatenated RLC PDUs), identify whether or not a LI flag associated with the RLC PDU header has been set, and when the LI flag has been set, extract from the LI field (e.g., 11 bit field included or associated with the RLC PDU header) a length for the of the RLC PDU. Based at least in part on the received RLC PDU and the length indicated by the LI field, segmentation and concatenation component 306 can ascertain where the demarcation or boundary lies between concatenated RLC PDUs. For instance, if a received and concatenated RLC PDU in total is 7,000 bytes, and the LI field indicates 2000 bytes, segmentation and concatenation component 306 can deduce that for the purposes of reconstituting the RLC SDU the first 2000 bytes should be associated with a first or initial RLC SDU and the remaining 5000 bytes should be associated with a second or subsequent RLC SDU. Thus, when reconstructing the respective RLC SDUs from received RLC PDUs, segmentation and concatenation component 306 can section or partition concatenated RLC PDUs using the LI field as indicative as to where the demarcation or boundary lies between the concluding portion of an initial or first RLC SDU and the initial portion of a subsequent or second RLC SDU. Segmentation and concatenation component 306 can thereafter aggregate or agglomerate the respective received RLC PDUs (and portions thereof) into apposite RLC SDUs.

In order to facilitate the foregoing therefore, segmentation and concatenation component 306 can include partition component 308 that on receipt of the RLC SDUs can ascertain the total size of the RLC SDUs and thereafter partition the received RLC SDUs into one or more RLC PDUs. Partition component 308 in conjunction with the facilities and/or functionalities provided by limitation component 310 can also ensure during the partitioning, splitting, or segmenting of the RLC SDUs that RLC PDUs that comprise or include the concluding or trailing portions of an RLC SDU do not exceed 2047 bytes in size. Additionally, partition component 308 can also employ facilities and functionalities provided by length indicator component 312 to set or ascertain the LI field associated with the RLC PDU. The LI field (as well as the LI flag) is typically included in the header of each RLC PDU. For instance, when a RLC PDU length is to be indicated, length indicator component 312 can be employed to set the LI field to the appropriate length of the ensuing RLC PDU as well as to set the LI flag (e.g., 1-bit included in the header of the RLC PDU) to indicate that the LI field contains sizing information related to the RLC PDU payload. It should be noted that since the LI field is currently standardized as being 11-bits in the header of the RLC PDU, the maximum size that can currently be indicated in the LI field is $2^{11}-1$ (e.g., 2047) bytes. Further in the context of length indicator component 312, length indicator component 312 can also adjust or modify the LI field to reflect the appropriate size value of the RLC PDU. Furthermore, partition component 308 in concert with facilities and/or functionalities supplied by construction component 314 can concatenate RLC PDUs in order to reduce the total number of RLC PDUs that are needed to dispatch large RLC SDUs (e.g., RLC SDUs that exceed 2047 bytes).

To place the foregoing in better context, consider the following example wherein two RLC SDUs each comprising 10,000 bytes are to be transmitted. Partition component 308 in collaboration with limitation component 310 can operate in the following manner. Partition component 308 in combination with limitation component 310 on receipt of the RLC SDUs can split, partition, or segment the first RLC SDU into two RLC PDUs, the first RLC PDU including 8,000 bytes from the first RLC SDU (e.g., initial information or commencing information from the first RLC SDU) and the second RLC PDU including the remaining or concluding 2,000 bytes from the first RLC SDU (e.g., concluding information or trailing information from the first RLC SDU). Further, partition component 308, once again in association with limitation component 310, can partition, segment, or split the second RLC SDU into two further RLC PDUs wherein the third RLC PDU can include 7,953 bytes from the second RLC SDU and the fourth RLC PDU can comprise 2047 bytes from the trailing end of the second RLC SDU (e.g., the fourth RLC PDU subject to a 2047 byte limitation). As will be observed from the foregoing illustration, partition component 308 in cooperation with limitation component 310 can ascertain the approach of the concluding portions of an RLC SDU, and based at least in part on identification of the concluding aspects of the RLC SDU, limitation component 310 can ensure that partition component 308 does not exceed the current 2047 byte limitation when it comes to including information from the trailing end of the RLC SDU into the associated RLC PDU. As will also be observed from the foregoing example, partition component 308 in concert with limitation component 310 ensures that the culminating or trailing portions (e.g., the trailing information) of an RLC SDU included in a RLC PDU does not exceed the 2047 byte limitation imposed by the current 3GPP standards, nevertheless, as will be further observed, the portions leading up to the concluding portions of the RLC SDU can be included into RLC PDUs of effectively unlimited size; all that is material in this instance is that the RLC PDU containing or comprising the trailing end of an RLC PDU not exceed the 2047 byte barrier.

In accordance with a further aspect, and as an extension of the foregoing example, partition component 308, limitation component 310, length indicator component 312, and construction component 314 can beneficially be utilized in the following additional and/or alternative manner to also partition, split, section, or segment incoming RLC SDUs into appropriate RLC PDUs. Once again for the sake of example, assume that two RLC SDUs each comprising 10,000 bytes are to be transmitted. Partition component 308 in concert with limitation component 310 on receipt of the two RLC SDUs can partition, section, segment, or split the first RLC SDU into two RLC PDUs, wherein the first RLC PDU includes 8,000 bytes from the first RLC SDU and the second RLC PDU includes the concluding 2,000 bytes from the first RLC SDU. Further, partition component 308, once again with the aid of limitation component 310, can also split, segment, partition, or section the second RLC SDU into two RLC PDUs, wherein one RLC PDU (e.g., the third RLC PDU) includes 7,953 bytes attributable to the second RLC SDU and the other RLC PDU (e.g., the fourth RLC PDU) comprises 2047 bytes from the concluding portion of the second RLC PDU. It should be noted that the second RLC PDU is constrained or subject to the 2047 byte limitation and the fourth RLC PDU is also subject to the 2047 byte limitation. At this juncture control can shift to length indicator component 312 which can set the LI flag (e.g., indicating whether or not the RLC PDU contains information in the LI field) and populate the LI field associated with the header of each RLC PDU with the byte count that conforms to the size of the RLC PDU. Once length indicator component 312 has set the LI flag and/or populated the LI fields associated with the header of the RLC PDU, construction component 314 can be employed to concatenate, aggregate, agglomerate, or conjoin appropriate RLC PDUs, which in this case would be the second and third RLC PDUs comprising data emanating from the tail end of the first RLC SDU and the initial portions of the second RLC SDU, into a single monolithic RLC PDU. In facilitating this task, construction component 314 can remove or negate the LI information (e.g., set the LI flag to indicate that information contained in the LI field is meaningless or that the LI field is not being utilized to convey size information) associated with every RLC PDU except RLC PDUs that have been concatenated or conjoined (e.g., the single monolithic RLC PDU), and even with these concatenated or conjoined RLC PDUs, construction component 314 needs to ensure that the only LI information (e.g., the LI flag and/or the LI field) associated with the leading RLC PDU (e.g., the second RLC PDU associated with the first RLC SDU) of the concatenated or conjoined whole is contained in the RLC PDU header.

It should be noted in the context of aggregating, agglomerating, conjoining, or concatenating the second and third RLC PDUs in the foregoing illustration, that the aggregated, agglomerated, concatenated, or conjoined and resultant RLC PDU (e.g., the single monolithic conjoined RLC PDU) contains but one header containing information regarding the length of the second RLC PDU (e.g., the demarcation or boundary between the second and third RLC PDU and the respective RLC SDUs from which each of the second and third RLC PDU is derived). Moreover, it should also be noted that the LI flags associated with non-concatenated or non-conjoined RLC PDUs typically do not require that their LI flags be set or that the associated LI field be populated with the size of the RLC PDU, since the quantity of information being carried in these RLC PDUs will generally outstrip the ability, for the purposes of this disclosure, of the LI field (e.g., currently limited by the 3GPP specification to be 11-bits) to convey relevant or pertinent size information.

In accordance with yet a further aspect, and as a further augmentation of the continuing example, when the RLC PDU packets are received at a corresponding and/or communicating receiving means, segmentation and concatenation component 306, and in particular partition component 308, limitation component 310, length indicator component 312, and construction component 314 can reconstitute or reassemble, RLC PDUs into RLC SDUs in the following manner. On reception of RLC PDUs, partition component 308 in collaboration with limitation component 310 and length indicator component 312 can investigate the incoming RLC PDUs to ascertain the relative order in which the RLC PDUs should be re-assembled and whether or not the received RLC PDUs have their respective LI flags set.

Where LI flags associated with the received RLC PDUs do not have their associated LI flags set, construction component 314 can assemble the RLC SDUs in the following manner, noting by way of the facilities provided by limitation component 310, that RLC PDUs that do not exceed a byte length of 2047 are typically attributable to the trailing end of RLC SDUs, Thus, in continuation of the example where the original RLC SDUs are each 10,000 bytes, partition component 308, limitation component 310, length indicator component 312, and construction component 314 can note that the first RLC PDU has a length of 8,000 bytes, and as such, based at least in part on its size (e.g., significantly larger than 2047 bytes), it can be concluded that the first RLC PDU does not contain the trailing portions of the first RLC SDU to be reconstructed, but rather contains the initial portions of the first RLC SDU, and as such construction component 314 can take this into account when reassembling the first RLC SDU. With regard to the second RLC PDU, partition component 308, limitation component 310, length indicator component 312, and construction component 314 can note that this RLC PDU does not exceed the 2047 byte limitation and as such it can be deduced, or at the very least presumed, that this second RLC PDU contains the trailing end of the first RLC SDU. Construction component 314, based at least in part on the deduction or presumption that since the second RLC PDU does not exceed 2047 bytes it must contain the trailing end of the first RLC SDU, can combine the first RLC PDU with the second RLC PDU to reassemble the first RLC SDU. As will be appreciated a similar process can be employed with respect to the third and fourth RLC PDUs.

Where on the other hand the LI flags of a select few RLC PDUs have been set, partition component 308, limitation component 310, length indicator component 312, and construction component 314 can adopt the following course of action. Once again in continuation of the foregoing example where the original RLC SDUs are each 10,000 bytes, partition component 308, limitation component 310, length indicator component 312, and construction component 314 can note that the first RLC PDU has a length of 8,000 bytes and that the LI flag has not been set and the LI field associated with the header of first RLC PDU is either empty or if not empty the data contained in the LI field is meaningless, accordingly, construction component 314 can make note that the first received RLC PDU contains data attributable to the first RLC SDU. Further, partition component 308, limitation component 310, length indicator component 312, and construction component 314 can note that the LI flag has been set, the value contained in the LI field (2,000 bytes) is meaningful (e.g., less than or equal 2047), and that actual transmitted size of the RLC PDU is significantly larger (e.g., 9,953 bytes) than the 2000 bytes indicated in the LI field. Based at least in part on this knowledge, partition component 308 can hive off and attribute the first 2000 bytes from the received RLC PDU as belonging to the first RLC SDU leaving the remaining 7,953 bytes as being attributable to the second RLC SDU. With regard to the last RLC PDU received in this instance, partition component 308, limitation component 310, length indicator component 312, and construction component 314 can note that this RLC PDU has a length of 2047 bytes and that the LI flag has not been set, accordingly, construction component 314 can make note that this RLC PDU contains data attributable to the second RLC SDU. At this stage, construction component 314 having noted the various attributions of the respective RLC PDUs can reassemble the RLC PDUs into their respective RLC SDUs.

It should be noted without limitation or loss of generality that while access terminal 304 has been described and depicted as including segmentation and concatenation component 306 (and its associated components), it will be apparent to those with a moderate comprehension of this field of endeavor, that a counterpart segmentation and concatenation component can also be situated or associated with base station 302 in order to perform the same or similar functionalities and/or to achieve the same or similar results. Additionally, it should further be noted without limitation or loss of generality that RLC SDUs can be of any size (e.g., larger or smaller than 2047 bytes), nevertheless solely for purposes of exposition and to provide context for the subject disclosure, the RLC SDUs expounded upon herein typically exceed 2047 bytes.

Figure 4:
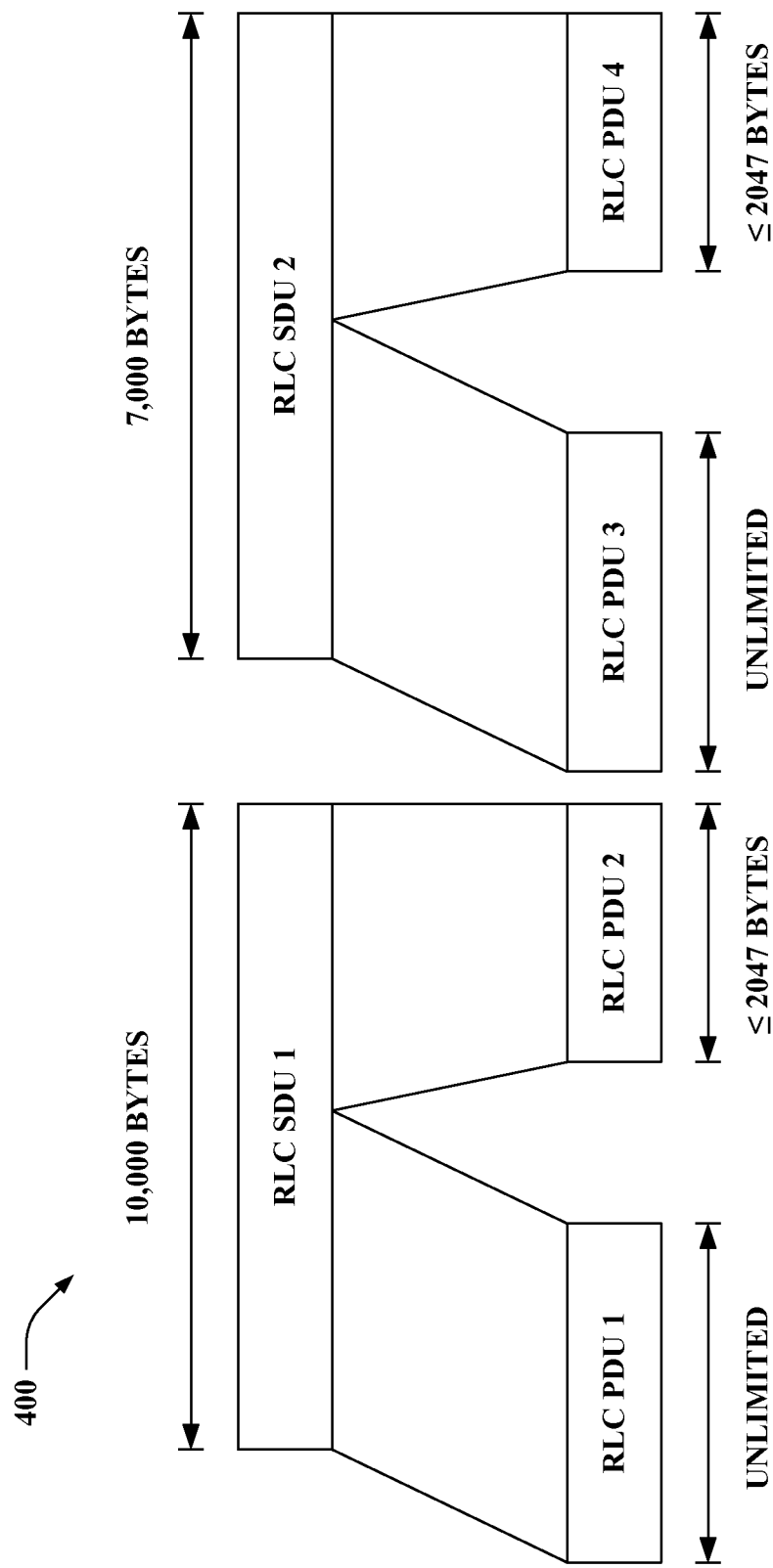
FIG. 4 is an illustration of a scheme for partitioning RLC SDUs that exceed the typical 2047 byte limitation currently extant in the 3GPP.

FIG. 4 provides illustration 400 of a scheme for partitioning RLC SDUs that exceed the typical 2047 byte limitation currently extant in the 3GPP standards. As will be observed two RLC SDUs are illustrated (e.g., RLC SDU 1 and RLC SDU 2) RLC SDU 1 being 10,000 bytes and RLC SDU 2 being 7,000 bytes in length. In accordance with this aspect of the disclosure, each of RLC SDU 1 and RLC SDU 2 can be partition into two RLC PDUs each (e.g., RLC PDU 1, RLC PDU 2, RLC PDU 3, and RLC PDU 4) wherein only RLC PDU2 and RLC PDU 4 are constrained by the 2047 byte length stricture. RLC PDU 1 and RLC PDU 3 can be of unlimited size and can significantly exceed the 2047 byte limitation currently imposed by the 3GPP standard.

Figure 5:
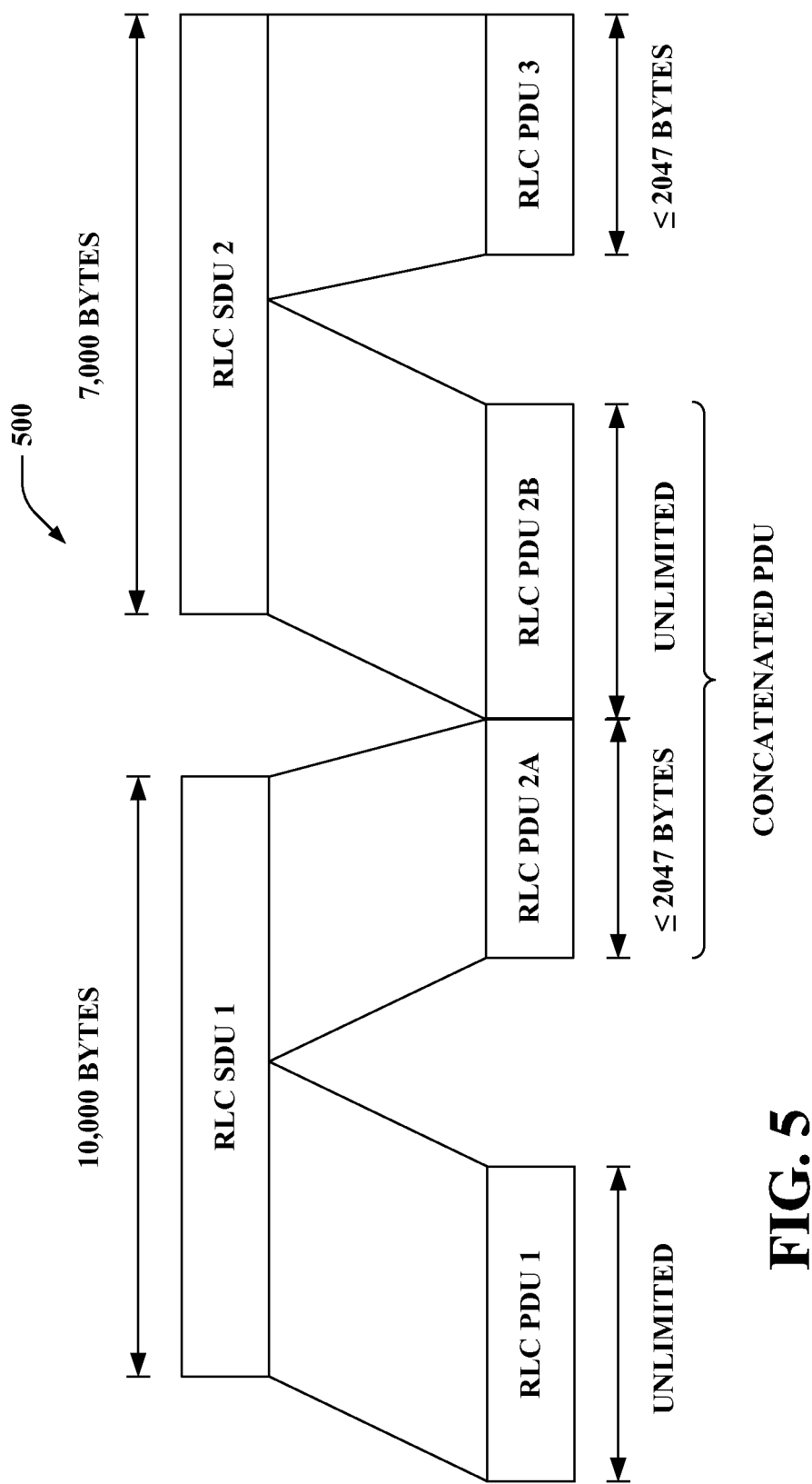
FIG. 5 depicts a further scheme for partitioning RLC SDUs that exceed the 2047 byte limitation currently extant in the 3GPP standard.

FIG. 5 provides depiction 500 of a further scheme for partitioning RLC SDUs that exceed the 2047 byte limitation currently extant in the 3GPP standard. In this instance, the two RLC SDUs have once again been partitioned into four (e.g., RLC PDU 1, RLC PDU 2A, RLC PDU 2B, and RLC PDU 3), but through the facilities and functionalities of the components elucidated above, only three RLC PDUs need be transmitted. Like the RLC PDUs expounded upon in FIG. 4, RLC PDU 1 and RLC PDU 2B can be of unlimited size, but RLC PDU 2A and RLC PDU 3 are limited to being less than 2048 bytes in length. However, unlike the situation presented in FIG. 4, where four distinct RLC PDUs are transmitted, as presented in FIG. 5 the second and third RLC PDUs (e.g., the RLC PDU (RLC PDU2A) comprising the trailing end of the first RLC SDU (RLC SDU 1) and third RLC PDU (RLC PDU2B) comprising the beginning portions of the second RLC SDU (RLC SDU 2)) are concatenated to form a single RLC PDU (e.g., a concatenated RLC PDU). This concatenated RLC PDU can include a RLC PDU header that has the LI flag set so that the means that receives the RLC PDU can be notified that the included LI field contains pertinent size information related to the concatenated RLC PDU (e.g., the size information included in the LI field pertains to the size of RLC PDU2A). It should be noted that under this conception, only the concatenated RLC PDU needs to contain a set LI flag and appropriately populated LI field indicating the size of a constituent component (e.g., RLC PDU 2A) of the concatenated PDU. It should be further noted that armed with the size of at least one of the constituent components of the concatenated PDU and the total size of the concatenated PDU, the concatenated PDU can be partitioned to furnish components of the respective RLC SDUs.

Figure 6:
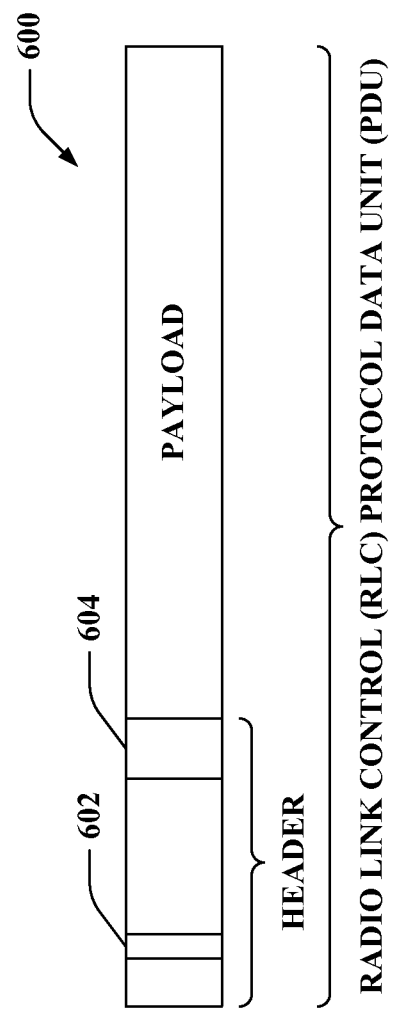
FIG. 6 depicts an illustrative RLC PDU that can be used in accordance with aspects of the subject disclosure.

FIG. 6 depicts an illustrative RLC PDU 600 that can be used in accordance with the subject disclosure. As illustrated RLC PDU can comprise two parts, a payload part wherein information from RLC SDUs can be situated and a header part that can include a 1-bit LI flag 602 and an 11-bit LI field 604. The 1-bit LI flag can be utilized to indicate whether or not the 11-bit LI field 604 contains any meaningful sizing information with regard to the payload part. For instance, if the payload contains 2,000 bytes of information the 1-bit LI flag 602 can be set and the 11-bit LI field 604 updated or populated to reflect that the payload contains 2,000 bytes of information. As will be appreciated by those moderately conversant in this field of endeavor, since the LI field 604 is 11-bits in length the maximum number that can be indicated by such a field is $2^{11}-1$ (e.g., 2047). Accordingly, and as exposited above, there can be occasions where the 1-bit LI flag 602 and 11-bit LI field are not utilized.

Referring to FIG. 7, FIG. 8, FIG. 9, and FIG. 10, methodologies relating to the segmenting and/or concatenating of RLC SDUs into RLC PDUs, wherein the RLC SDUs typically have sizes that exceed 2047 bytes are respectively illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 7:
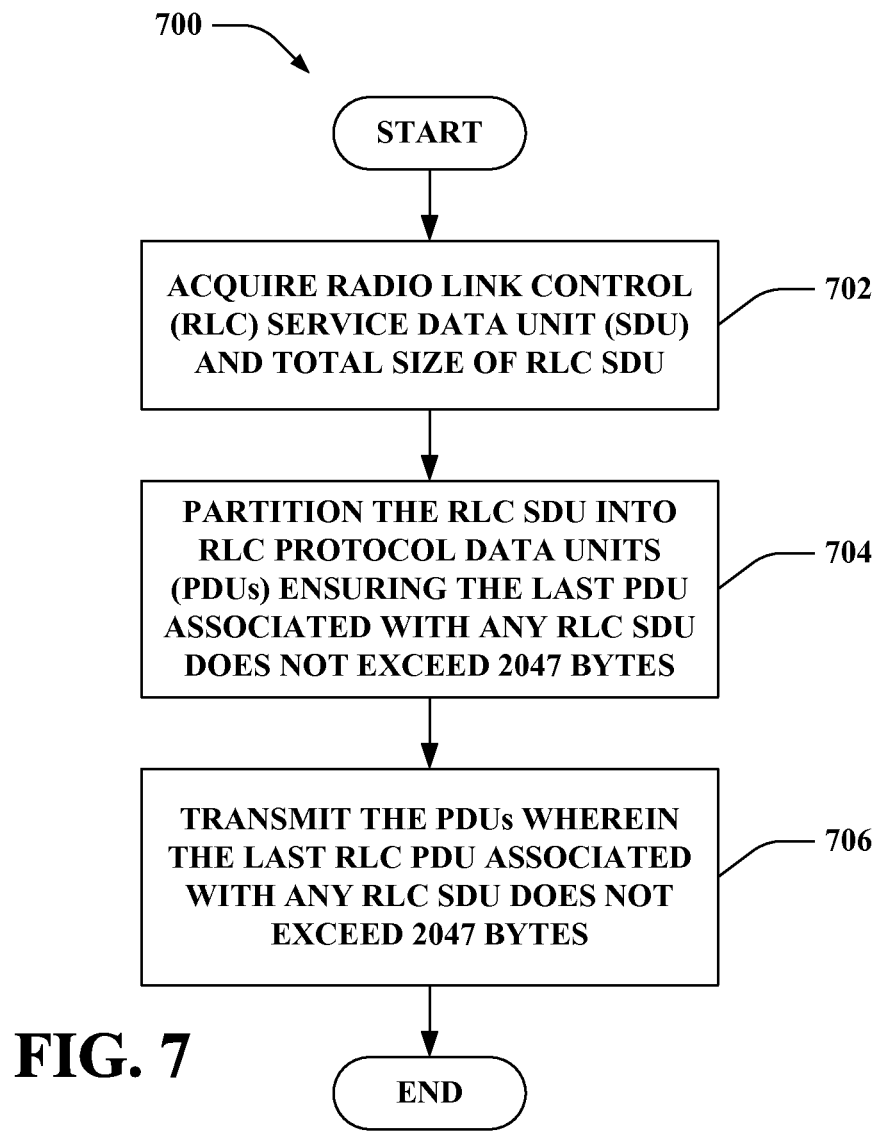
FIG. 7 is an illustration of an example methodology for segmenting and/or concatenating RLC SDUs into RLC PDUs where the RLC SDUs have sizes that exceed 2047 bytes.

With reference to FIG. 7, an illustrative methodology 700 is presented for segmenting and/or concatenating RLC SDUs into RLC PDUs, wherein the RLC SDUs typically have sizes that exceed 2047 bytes. Method 700 can commence at 702 where RLC SDU can be acquired and an ascertainment can be made as to the size of the RLC SDU. At 704 the RLC SDU can be partitioned into RLC PDUs wherein during the partitioning, RLC PDUs associated with the trailing end or concluding aspects of an RLC SDU are limited so as not to exceed a 2047 byte limit. At 706 the RLC PDUs can be transmitted wherein during the transmission RLC PDUs associated with the tail ends of RLC SDUs are monitored to ensure that they do not exceed a 2047 byte threshold.

Figure 8:
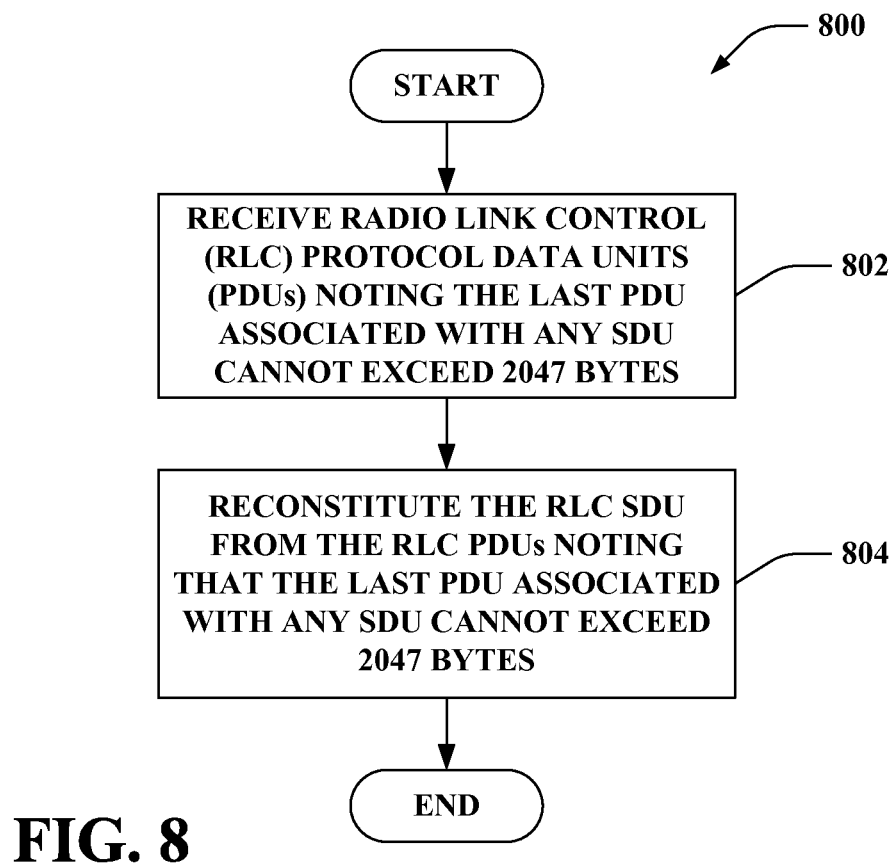
FIG. 8 is an illustration of an example methodology for segmenting and/or concatenating RLC SDUs into RLC PDUs where the RLC SDUs have sizes that exceed 2047 bytes.

With reference to FIG. 8, a further illustrative methodology 800 is presented for segmenting and/or concatenating RLC SDUs into RLC PDUs, wherein the RLC SDUs typically have sizes that exceed 2047 bytes. Method 800 can commence at 802 where RLC PDUs can be received whereupon during reception it is noted that RLC PDUs that do not exceed 2047 are to be associated with trailing ends of respective RLC SDUs. At 804 the RLC PDUs can be reconstituted into RLC SDUs wherein the RLC PDUs that have been previously noted as not exceeding 2047 bytes are deemed as being the concluding portions of an RLC SDU, and RLC PDUs that exceed the 2047 byte limitation are deemed to be the commencing portions of the RLC SDU.

Figure 9:
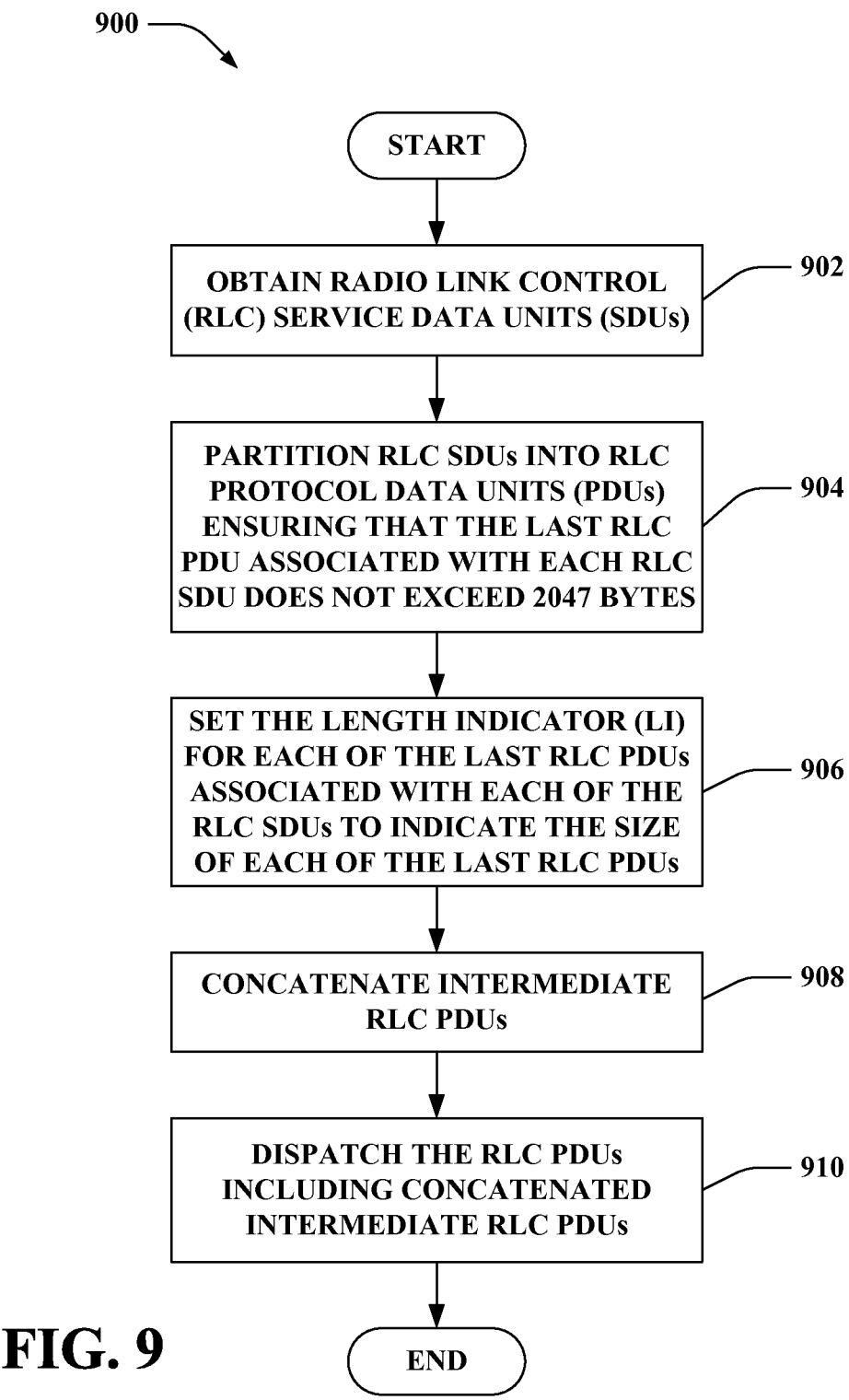
FIG. 9 is an illustration of an example methodology for segmenting and/or concatenating RLC SDUs into RLC PDUs where the RLC SDUs have sizes that exceed 2047 bytes.

With reference to FIG. 9, a further illustrative methodology 900 is presented for segmenting and/or concatenating RLC SDUs into RLC PDUs, wherein the RLC SDUs typically have sizes that exceed 2047 bytes. Method 900 can commence at 902 where RLC SDUs are obtained or acquired. At 904 the RLC SDUs are partitioned into RLC PDUs wherein during the partitioning special note is made in connection with the concluding portions of an RLC SDU such that the RLC PDU that is to convey the trailing end of the RLC SDU does not exceed 2047 bytes. At 906 a LI field (and associated LI flag) can be appropriately provisioned with the byte size of RLC PDUs containing the culminating portions of an RLC SDU. At 908 intermediate RLC PDUs can be concatenated wherein the LI field (and LI flag) of the RLC PDU containing the non-concluding portion of an RLC SDU is obliterated. At 910 all the generated RLC PDUs including concatenated intermediate RLC PDUs can be dispatched.

Figure 10:
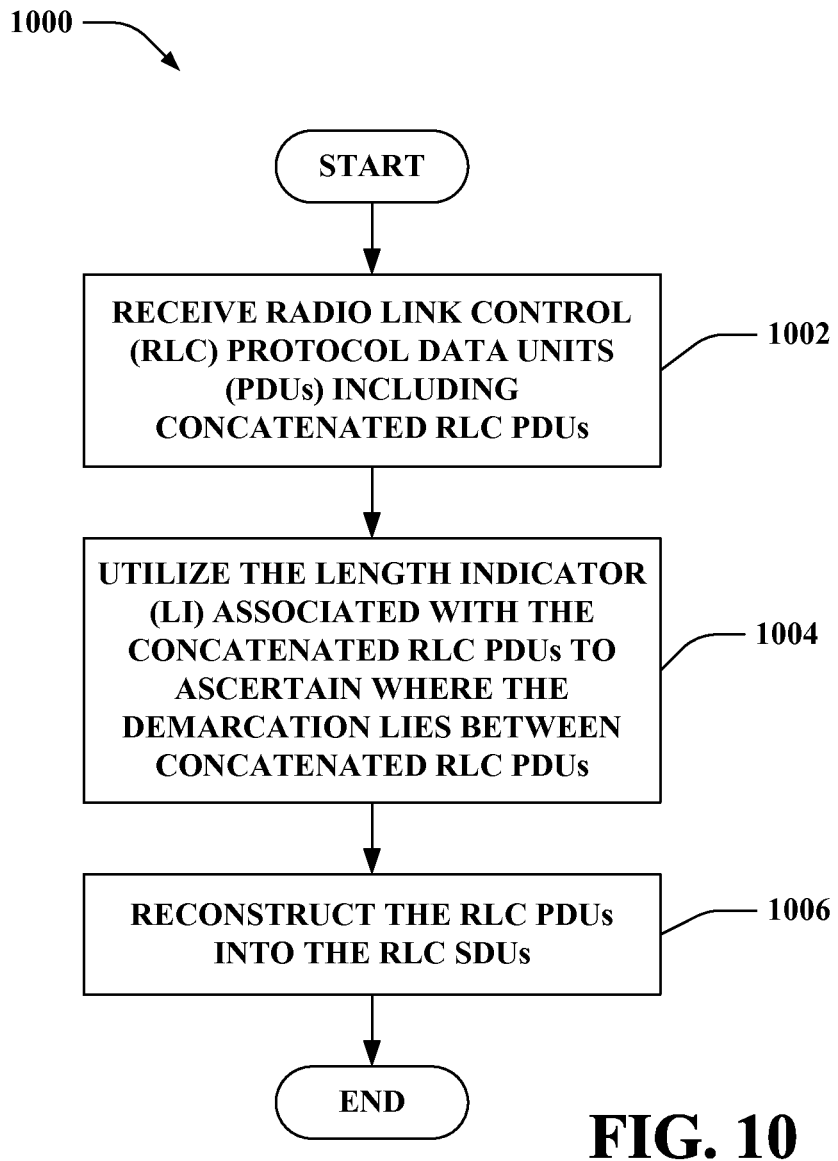
FIG. 10 is an illustration of an example methodology for segmenting and/or concatenating RLC SDUs into RLC PDUs where the RLC SDUs have sizes that exceed 2047 bytes.

With reference to FIG. 10, an illustrative methodology 1000 is presented for segmenting and/or concatenating RLC SDUs into RLC PDUs, wherein the RLC SDUs typically have sizes that exceed 2047 bytes. Method 1000 can commence at 1002 where RLC PDUs including concatenated or conjoined RLC PDUs can be received. At 1004 the LI field associated with concatenated or conjoined RLC PDUs can be utilized to ascertain where the demarcation or boundary lies between two RLC PDUs that have been previously conjoined or concatenated. At 1006 the RLC PDUs can be reconstituted or reassembled into the RLC SDUs.

It will be appreciated that, in accordance with one or more aspects described herein, inferences can be made regarding segmenting and/or concatenating RLC SDUs into RLC PDUs where the RLC SDUs typically exceed 2047 bytes. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
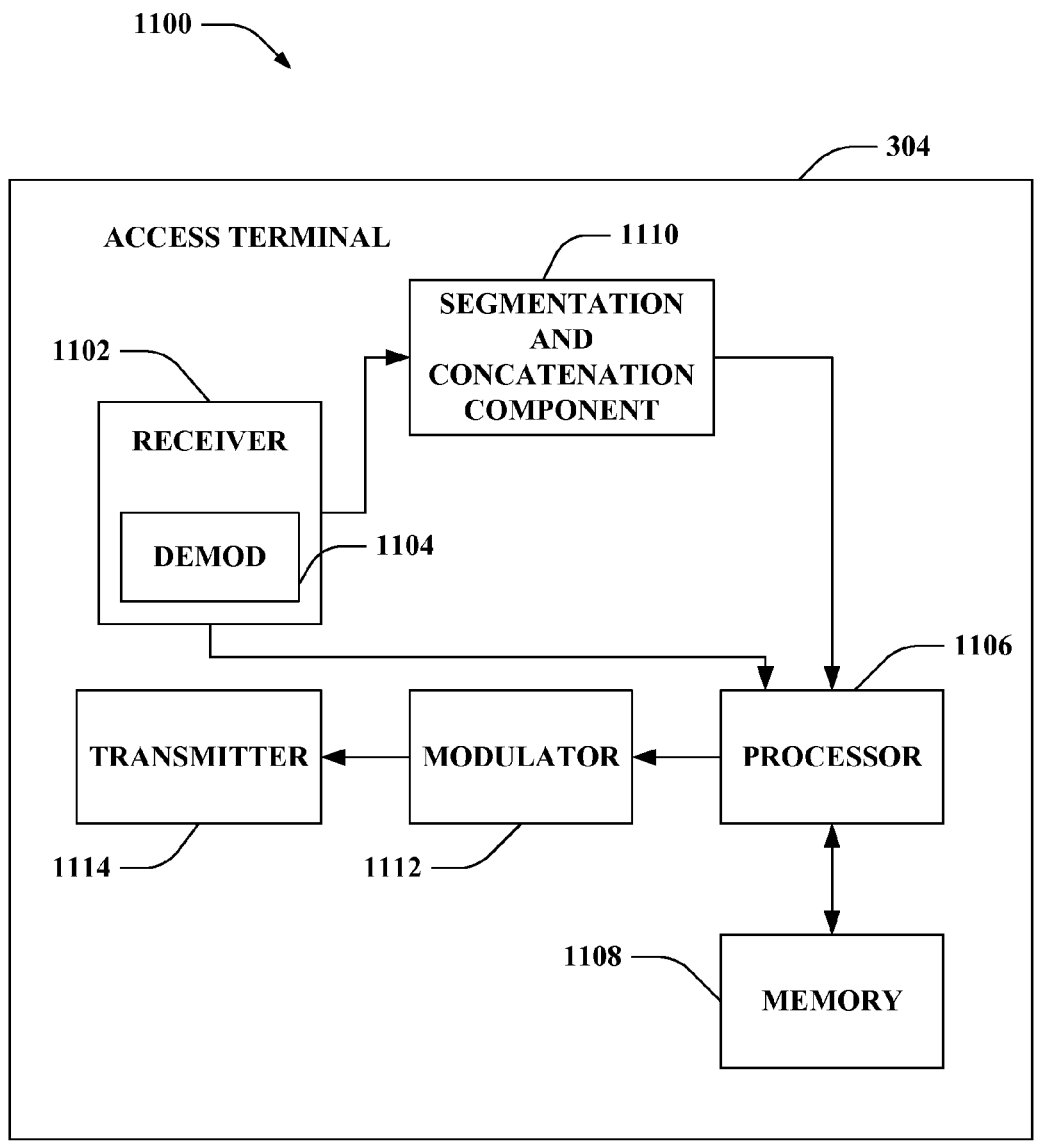
FIG. 11 is an illustration of an example access terminal that segments and/or concatenates RLC SDUs into RLC PDUs where the RLC SDUs have sizes that exceed 2047 bytes.

FIG. 11 is an illustration 1100 of an access terminal 304 that segments and/or concatenates RLC SDUs into RLC PDUs, wherein the RLC SDUs typically have sizes that exceed 2047 bytes. Access terminal 304 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1114, a processor that controls one or more components of access terminal 304, and/or a processor that both analyzes information received by receiver 1102, generates information for transmission by transmitter 1114, and controls one or more components of access terminal 304.

Access terminal 304 can additionally comprise memory 1108 that is operatively coupled to processor 1106 and that can store data to be transmitted, received data, and any other suitable information related to performing the various actions and functions set forth herein. For instance, memory 1108 can store group-specific signaling constraints employed by one or more base stations. Memory 1108 can additionally store protocols and/or algorithms associated with identifying signaling constraints used for communicating resource block assignments and/or employing such signaling constraints to analyze received assignment messages.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to a segmentation and concatenation component 1110 which can be substantially similar to segmentation and concatenation component 306 of FIG. 3. Segmentation and concatenation component 1110 can be employed to search and/or track of neighboring cells for purposes of handover or other applications, such as, location inference and/or cooperative transmission from base stations. Access terminal 304 still further comprises a modulator 1112 and a transmitter 1114 that transmits the signal to, for instance, a base station, another access terminal, etc. Although depicted as being separate from the processor 1106, it is to be appreciated that segmentation and concatenation component 1110 and/or modulator 1112 can be part of processor 1106 or a number of processors (not shown).

Figure 12:
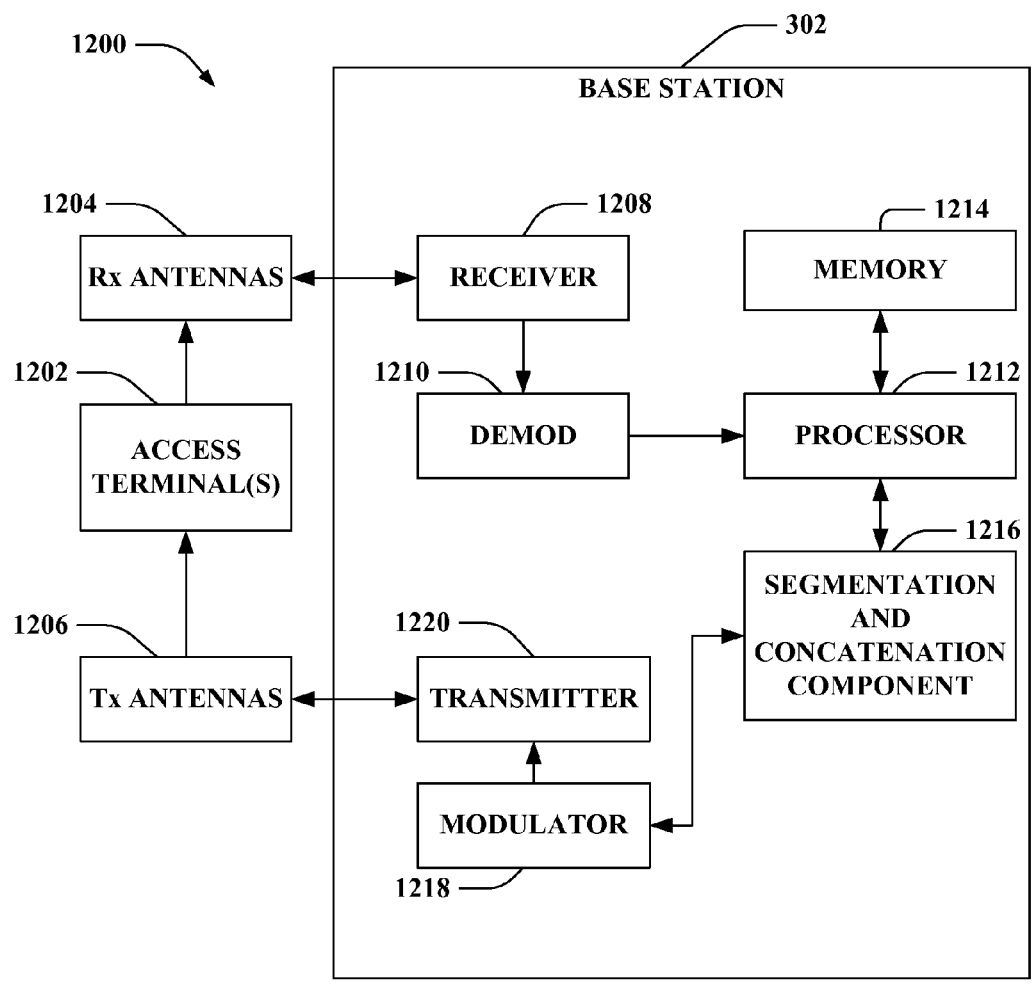
FIG. 12 is an illustration of an example base station that segments and/or concatenates RLC SDUs into RLC PDUs where the RLC SDUs have sizes that exceed 2047 bytes.

FIG. 12 is an illustration of a system 1200 that segments and/or concatenates RLC SDUs into RLC PDUs, wherein the RLC SDUs typically have sizes that exceed 2047 bytes. System 1200 comprises a base station 302 (e.g., access point, . . . ) with a receiver 1208 that receives signal(s) from one or more access terminals 304 through a plurality of receive antennas 1204, and a transmitter 1220 that transmits to the one or more access terminals 1202 through a transmit antenna 1206. Receiver 1208 can receive information from receive antennas 1204 and is operatively associated with a demodulator 1210 that demodulates received information. Demodulated symbols are analyzed by a processor 1212 that can be similar to the processor described above with regard to FIG. 11, and which is coupled to a memory 1214 that stores data to be transmitted to or received from access terminal(s) 1202 (or a disparate base station (not shown)) and/or any other suitable information related to performing the various actions and functions set forth herein. Processor 1212 is further coupled to a segmentation and concatenation component 1216 that facilitate transmission of circuit switched voice over packet switched networks. Further, segmentation and concatenation component 1216 can provide information to be transmitted to a modulator 1218. Modulator 1218 can multiplex a frame for transmission by a transmitter 1220 through antennas 1206 to access terminal(s) 1202. Although depicted as being separate from the processor 1212, it is to be appreciated that segmentation and concatenation component 1216 and/or modulator 1218 can be part of processor 1212 or a number of processors (not shown).

Figure 13:
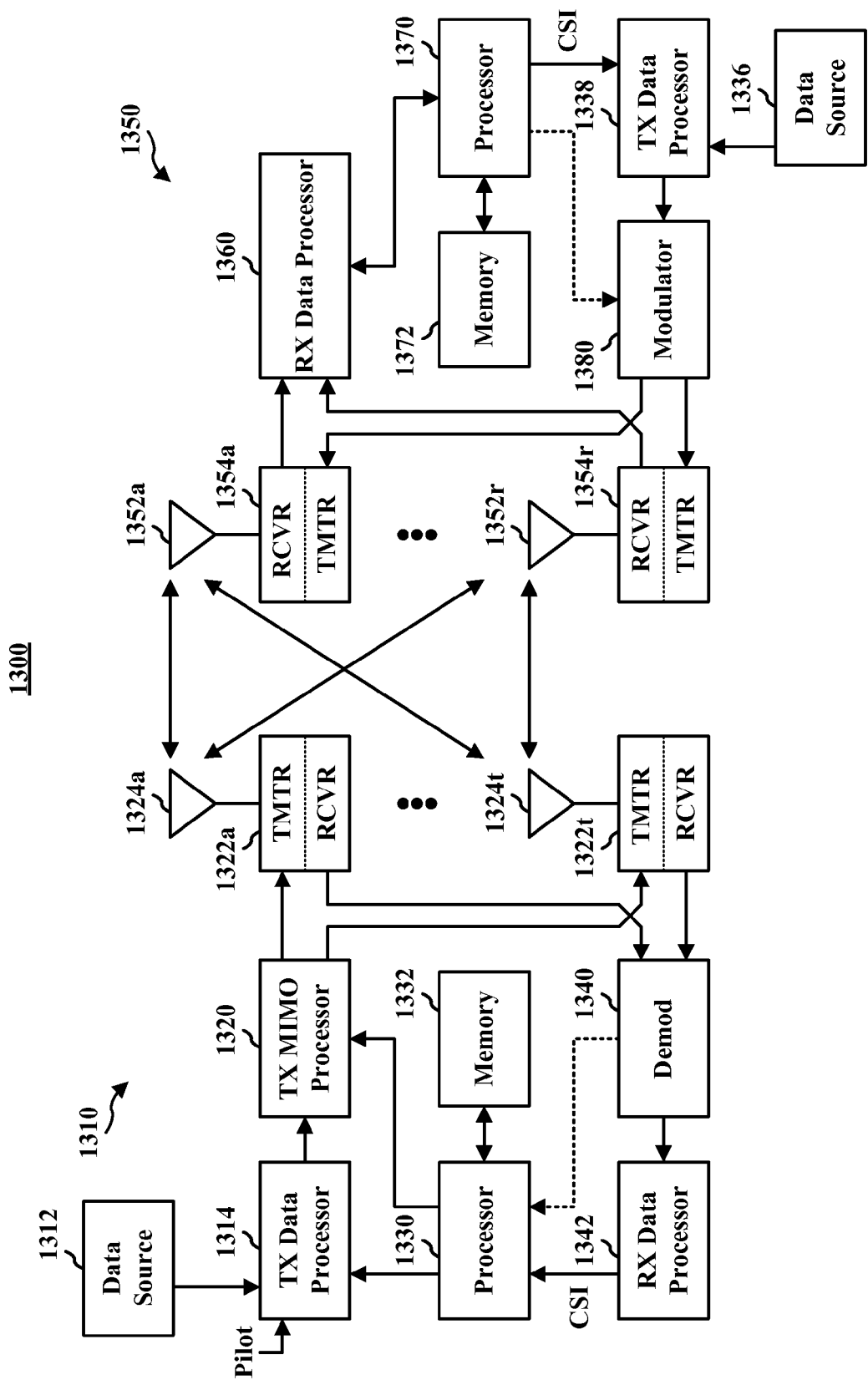
FIG. 13 is an illustration of an example wireless network environment that can be employed in conjunction with the various systems and methods described herein.

FIG. 13 shows an example wireless communication system 1300. The wireless communication system 1300 depicts one base station 1310 and one access terminal 1350 for sake of brevity. However, it is to be appreciated that system 1300 can include more than one base station and/or more than one access terminal, wherein additional base stations and/or access terminals can be substantially similar or different from example base station 1310 and access terminal 1350 described below. In addition, it is to be appreciated that base station 1310 and/or access terminal 1350 can employ the systems (FIGS. 3, 11-12, and 14-15) and/or methods (FIGS. 7-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At access terminal 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which available technology to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from access terminal 1350 are received by antennas 1324, conditioned by receivers 1322, demodulated by a demodulator 1340, and processed by a RX data processor 1342 to extract the reverse link message transmitted by access terminal 1350. Further, processor 1330 can process the extracted message to determine which precoding matrix to use for determining the beamforming weights.

Processors 1330 and 1370 can direct (e.g., control, coordinate, manage, etc.) operation at base station 1310 and access terminal 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ...) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PS-DCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
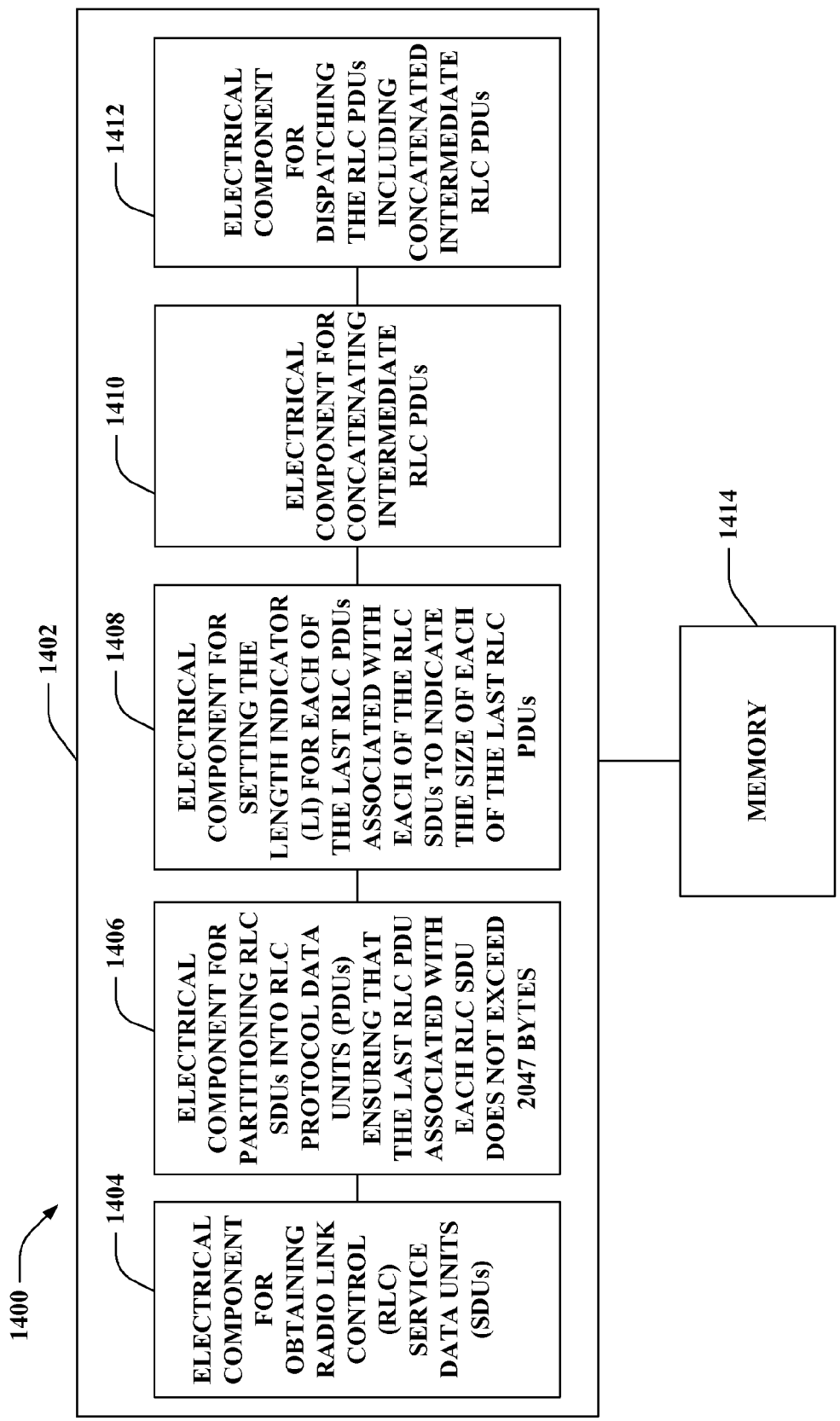
FIG. 14 is an illustration of an example system that facilitates and/or effectuates segmentation and/or concatenation of RLC SDUs into RLC PDUs where the RLC SDUs have sizes that exceed 2047 bytes.

Turning to FIG. 14, illustrated is a system 1400 that segments and/or concatenates RLC SDUs into RLC PDUs where the RLC SDUs typically have sizes that surpass 2047 bytes. System 1400 can reside within an access terminal or a base station, for instance. As depicted, system 1400 includes functional blocks that can represent functions implemented by a processor, software, or combination thereof (e.g., firmware). System 1400 includes a logical grouping 1402 of electrical components that can act in conjunction. Logical grouping 1402 can include an electrical component for obtaining radio link control (RLC) service data units (SDUs) 1404. Further, logical grouping 1402 can include an electrical component for partitioning RLC SDUs into RLC PDUs ensuring that the last RLC PDU associated with each RLC SDU does not exceed 2047 bytes 1406. Moreover, logical grouping 1402 can include an electrical component for setting the length indicator (LI) for each of the last RLC PDUs associated with each of the RLC SDUs to indicate the size of each of the last RLC PDUs. 1408. Furthermore, logical grouping 1402 can include an electrical component for concatenating intermediate RLC PDUs 1410. Moreover, logical grouping 1402 can include an electrical component for dispatching the RLC PDUs including concatenated intermediate RLC PDUs 1412. Additionally, system 1400 can include a memory 1414 that retains instructions for executing functions associated with electrical components 1404, 1406, 1408, 1410, and 1412. While shown as being external to memory 1414, it is to be understood that electrical components 1404, 1406, 1408, 1410, and 1412 can exist within memory 1414.

Figure 15:
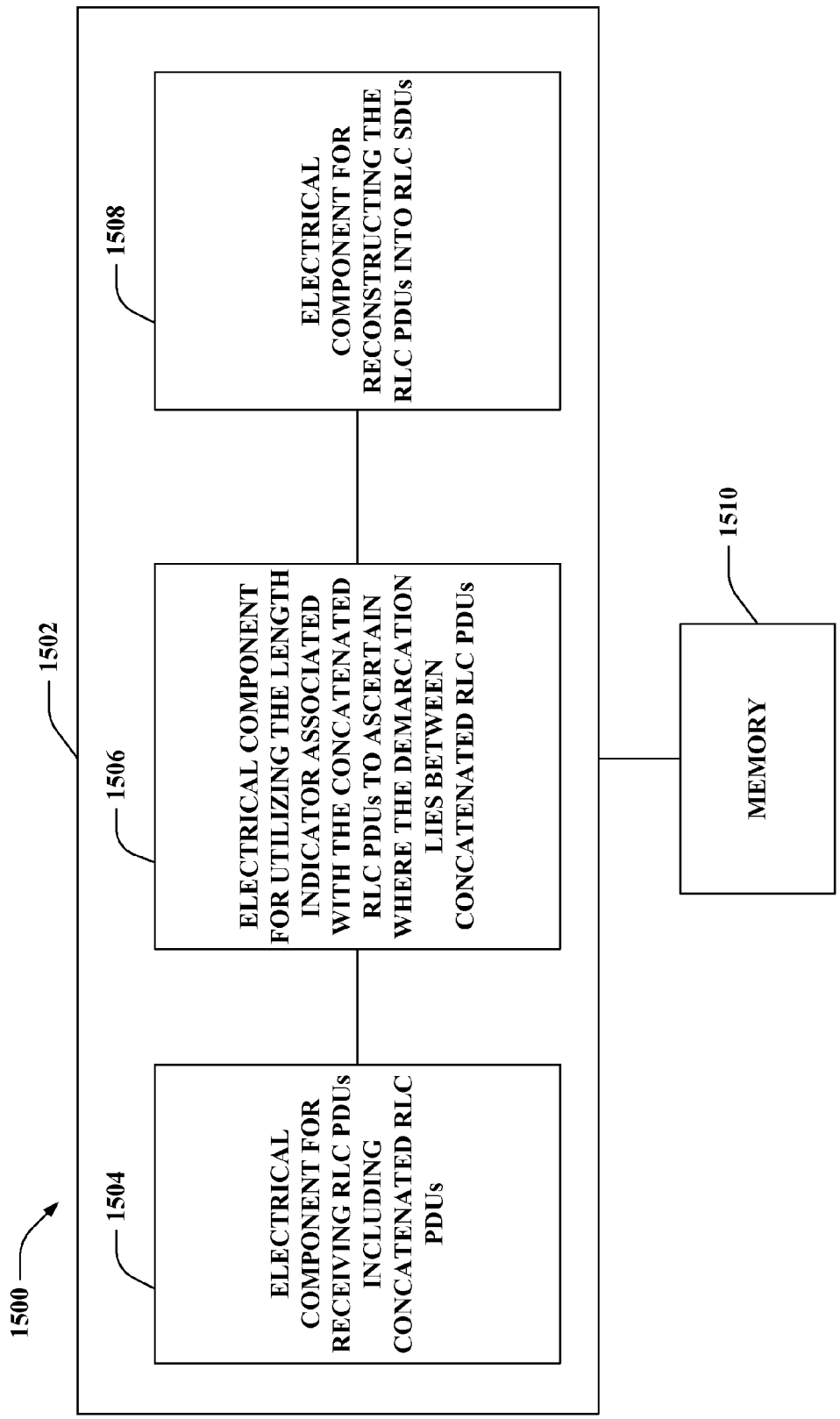
FIG. 15 is an illustration of a further example system that facilitates and/or effectuates segmentation and/or concatenation of RLC SDUs into RLC PDUs where the RLC SDUs have sizes that exceed 2047 bytes.

Turning to FIG. 15, illustrated is a system 1500 that segments and/or concatenates RLC SDUs into RLC PDUs, wherein the RLC SDUs typically have sizes that exceed 2047 bytes. System 1500 can reside within an access terminal or base station, for instance. As depicted, system 1500 includes functional blocks that can represent functions implemented by a processor, software, or combination thereof (e.g., firmware). System 1500 includes a logical grouping 1502 of electrical components that can act in conjunction. Logical grouping 1502 can include an electrical component for receiving radio link control (RLC) protocol data units (PDUs) including concatenated RLC PDUs 1504. Further, logical grouping 1502 can include an electrical component for utilizing the length indicator (LI) associated with the concatenated RLC PDUs to ascertain where the demarcation lies between concatenated RLC PDUs 1506. Moreover, logical grouping 1502 can include an electrical component for reconstructing the RLC PDUs into the RLC SDUs 1508. Additionally, system 1500 can include a memory 1510 that retains instructions for executing functions associated with electrical components 1504, 1506, and 1508. While shown as being external to memory 1510, it is to be understood that electrical components 1504, 1506, and 1508 can exist within memory 1510.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that segments or concatenates radio link control (RLC) service data units (SDUs) into RLC protocol data units (PDUs), comprising:
   receiving a first RLC SDU;
   partitioning the first RLC SDU into a first RLC PDU and a second RLC PDU, the second RLC PDU being less than or equal to 2047 bytes;
   setting a length indicator (LI) field associated with the second RLC PDU to indicate the size of information contained in the second RLC PDU;
   concatenating the second RLC PDU with a third RLC PDU to form a concatenated RLC PDU, the third RLC PDU being partitioned from a second RLC SDU and the third RLC PDU being greater than or equal to one byte; and
   dispatching the first RLC PDU, the concatenated RLC PDU, and a fourth RLC PDU associated with the second RLC SDU, a size of the first RLC PDU being different than a size of the second RLC PDU.

2. The method of claim 1, further comprises setting a LI flag associated with the second RLC PDU.

3. The method of claim 1, wherein the size of the first RLC PDU associated with the first RLC SDU is greater than 2047 bytes and the first RLC PDU includes initial information from the first RLC SDU.

4. The method of claim 1, wherein the second RLC PDU associated with the first RLC SDU includes trailing information from the first RLC SDU.

5. The method of claim 1, wherein a size of the third RLC PDU associated with the second RLC SDU is greater than 2047 bytes and the third RLC PDU includes commencing information from the second RLC SDU.

6. The method of claim 1, wherein a size of the fourth RLC PDU is less than or equal to 2047 bytes.

7. A wireless communications apparatus, comprising:
   a memory that retains instructions related to:
      segmenting a first radio link control (RLC) service data unit (SDU) into a first RLC protocol data unit (PDU) and a second RLC PDU, the second RLC PDU being less than or equal to 2047 bytes,
      setting a length indicator (LI) field associated with the second RLC PDU to indicate the size of information contained in the second RLC PDU,
      concatenating the second RLC PDU with a third RLC PDU to form a concatenated RLC PDU, the third RLC PDU being partitioned from a second RLC SDU and the third RLC PDU being greater than or equal to one byte, and
      dispatching the first RLC PDU, the concatenated RLC PDU, and a fourth RLC PDU associated with the second RLC SDU, a size of the first RLC PDU and the third RLC PDU being different than a size of the second RLC PDU and the fourth RLC PDU; and
   a processor, coupled to the memory, configured to execute the instructions retained in the memory.

8. The wireless communications apparatus of claim 7, wherein the size of first RLC PDU associated with the first RLC SDU is greater than 2047 bytes and the first RLC PDU includes initial information from the first RLC SDU.

9. The wireless communications apparatus of claim 7, wherein the second RLC PDU associated with the first RLC SDU includes trailing information from the first RLC SDU.

10. The wireless communications apparatus of claim 7, wherein a size of the third RLC PDU associated with the second RLC SDU is greater than 2047 bytes and the third RLC PDU includes commencing information from the second RLC SDU.

11. The wireless communications apparatus of claim 7, wherein a size the fourth RLC PDU is less than or equal to 2047 bytes.

12. A computer program product, comprising:
   a non-transitory computer-readable medium having non-transitory program code recorded thereon, the program code comprising:
      code for receiving a first radio link control (RLC) service data unit (SDU);
      code for dividing the first RLC SDU into a first RLC protocol data unit (PDU) and a second RLC PDU, the second RLC PDU being less than or equal to 2047 bytes;
      code for setting a length indicator (LI) field associated with the second RLC PDU to indicate the size of information contained in the second RLC PDU;
      code for conjoining the second RLC PDU with a third RLC PDU to form a concatenated RLC PDU, the third RLC PDU being partitioned from a second RLC SDU and the third RLC PDU being greater than or equal to one byte; and
      code for dispatching the first RLC PDU, the concatenated RLC PDU, and a fourth RLC PDU associated with the second RLC SDU, a size of the first RLC PDU being different than a size of the second RLC PDU.

13. The computer program product of claim 12, wherein the size of the first RLC PDU associated with the first RLC SDU is greater than 2047 bytes and the first RLC PDU includes initial information from the first RLC SDU.

14. The computer program product of claim 12, wherein the second RLC PDU associated with the first RLC SDU includes trailing information from the first RLC SDU.

15. The computer program product of claim 12, wherein a size of the third RLC PDU associated with the second RLC SDU is greater than 2047 bytes and the third RLC PDU includes commencing information from the second RLC SDU.

16. The computer program product of claim 12, wherein a size of the fourth RLC PDU is less than or equal to 2047 bytes.

17. A wireless communications apparatus, comprising:
   a memory; and
   at least one processor coupled to the memory, the at least one processor being configured
      to receive a first radio link control (RLC) service data unit (SDU);
      to split the first RLC SDU into a first RLC protocol data unit (PDU) and a second RLC PDU, the second RLC PDU being less than or equal to 2047 bytes;
      to set a length indicator (LI) field associated with the second RLC PDU to indicate the size of information contained in the second RLC PDU;
      to concatenate the second RLC PDU with a third RLC PDU to form a concatenated RLC PDU, the third RLC PDU being partitioned from a second RLC SDU and the third RLC PDU being greater than or equal to one byte; and
      to dispatch the first RLC PDU, the concatenated RLC PDU, and a fourth RLC PDU associated with the second RLC SDU, a size of the first RLC PDU being different than a size of the second RLC PDU.

18. A method that segments or concatenates radio link control (RLC) service data units (SDUs) into RLC protocol data units (PDUs), comprising: receiving a first RLC PDU, a concatenated PDU, and a fourth RLC PDU;

utilizing a length indicator (LI) field associated with the concatenated PDU to ascertain a boundary between a second RLC PDU and a third RLC PDU, the second RLC PDU and the third RLC PDU included in the concatenated PDU, the LI field indicating a size of information contained in the second RLC PDU, the second RLC PDU being less than or equal to 2047 bytes and the third RLC PDU being greater than or equal to one byte; and reassembling the first RLC PDU, the second RLC PDU, the third RLC PDU, and the fourth RLC PDU into a first RLC SDU and a second RLC SDU, a size of the first RLC PDU being different than a size of the second RLC PDU.

19. The method of claim 18, wherein the LI field is a 11-bit field included in a header associated with the concatenated PDU.

20. The method of claim 18, wherein the second RLC PDU and the fourth RLC PDU include respective concluding portions of the first RLC SDU and the second RLC SDU.

21. The method of claim 18, wherein the size of the first RLC PDU and a size of the third RLC PDU are greater than 2047 bytes.

22. The method of claim 18, wherein a size of the fourth RLC PDU is less than or equal to 2047 bytes.

23. A wireless communications apparatus, comprising:
a memory that retains instructions related to:
    acquiring a first radio link (RLC) protocol data unit (PDU), a concatenated PDU, and a fourth RLC PDU,
    ascertaining a boundary between a second RLC PDU and a third RLC PDU by using a length indicator (LI) field associated with the concatenated PDU, the second RLC PDU and the third RLC PDU included in the concatenated PDU, the LI field indicating a size of information contained in the second RLC PDU, the second RLC PDU being less than or equal to 2047 bytes and the third RLC PDU being greater than or equal to one byte, and
    reassembling the first RLC PDU and the second RLC PDU into a first RLC service data unit (SDU) and the third RLC PDU and the fourth RLC PDU into a second RLC SDU, a size of the first RLC PDU being different than a size of the second RLC PDU; and a processor, coupled to the memory, configured to execute the instructions retained in the memory.

24. A computer program product, comprising:
a non-transitory computer-readable medium having non-transitory program code recorded thereon, the program code comprising:
    code for receiving a first radio link control (RLC) protocol data unit (PDU), a concatenated PDU, and a fourth RLC PDU;
    code for ascertaining a boundary between a second RLC PDU and a third RLC PDU by using a length indicator (LI) field associated with the concatenated PDU, the second RLC PDU and the third RLC PDU included in the concatenated PDU, the LI field indicating a size of information contained in the second RLC PDU, the second RLC PDU being less than or equal to 2047 bytes and the third RLC PDU being greater than or equal to one byte; and
    code for reassembling the first RLC PDU and the second RLC PDU into a first RLC service data unit (SDU) and the third RLC PDU, and the fourth RLC PDU into a second RLC SDU, a size of the first RLC PDU being different than a size of the second RLC PDU.

25. A wireless communications apparatus, comprising:
a memory; and
at least one processor coupled to the memory, the at least one processor being configured:
    to receive a first radio link control (RLC) protocol data unit (PDU), a concatenated PDU, and a fourth RLC PDU;
    to ascertain a boundary between a second RLC PDU and a third RLC PDU by using a length indicator (LI) field associated with the concatenated PDU, the second RLC PDU and the third RLC PDU included in the concatenated PDU, the LI field indicating a size of information contained in the second RLC PDU, the second RLC PDU being less than or equal to 2047 bytes and the third RLC PDU being greater than or equal to one byte; and
    to reassemble the first RLC PDU, the second RLC PDU, the third RLC PDU, and the fourth RLC PDU respectively into a first RLC service data unit (SDU) and a second RLC SDU, a size of the first RLC PDU being different than a size of the second RLC PDU.

* * * * *